(12) United States Patent
Lu et al.

(10) Patent No.: US 12,288,383 B2
(45) Date of Patent: Apr. 29, 2025

(54) USING TRAINING IMAGES AND SCALED TRAINING IMAGES TO TRAIN AN IMAGE SEGMENTATION MODEL

(71) Applicant: Tencent Technology (Shenzhen) Company Limited, Guangdong (CN)

(72) Inventors: Donghuan Lu, Shenzhen (CN); Kai Ma, Shenzhen (CN); Yefeng Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 344 days.

(21) Appl. No.: 17/955,726

(22) Filed: Sep. 29, 2022

(65) Prior Publication Data

US 2023/0021551 A1   Jan. 26, 2023

Related U.S. Application Data

(63) Continuation of application No. PCT/CN2021/124337, filed on Oct. 18, 2021.

(30) Foreign Application Priority Data

Dec. 16, 2020   (CN) .......................... 202011487554.0

(51) Int. Cl.
*G06V 10/774*   (2022.01)
*G06F 18/2415*   (2023.01)
(Continued)

(52) U.S. Cl.
CPC ........ *G06V 10/774* (2022.01); *G06F 18/2415* (2023.01); *G06N 3/045* (2023.01);
(Continued)

(58) Field of Classification Search
CPC .... G06V 10/774; G06V 10/40; G06V 10/764; G06V 10/82; G06T 3/40; G06T 7/149;
(Continued)

(56) References Cited

U.S. PATENT DOCUMENTS

2018/0108137 A1   4/2018   Price et al.
2020/0272864 A1*  8/2020   Faust .................. G06V 10/764

FOREIGN PATENT DOCUMENTS

CN   110543911 A   * 12/2019   ............. G06K 9/342
CN   111401247 A   *  7/2020   ......... G06K 9/00362
CN   111582175 A   *  8/2020   ........... G06K 9/0063

OTHER PUBLICATIONS

Xue, Y. et al., "Adversarial Learning with Multi-Scale Loss for Skin Lesion Segmentation," 2018 IEEE 15th International Symposium on Biomedical Imaging (ISBI 2018), 2018, pp. 859-863. (Year: 2018).*

(Continued)

*Primary Examiner* — Amandeep Saini
*Assistant Examiner* — Daniella M. DiGuglielmo
(74) *Attorney, Agent, or Firm* — ArentFox Schiff LLP

(57) ABSTRACT

A method for training an image segmentation model includes calling an encoder to perform feature extraction on a sample image and a scale image to obtain a sample image feature and a scale image feature. The method also includes performing a class activation graph calculation to obtain a sample class activation graph and a scale class activation graph. The method also includes calling a decoder to obtain a sample segmentation result of the sample image, and calling the decoder to obtain a scale segmentation result of the scale image. The method also includes calculating a class activation graph loss and calculating a scale loss. The method also includes training the decoder based on the class activation graph loss and the scale loss.

20 Claims, 8 Drawing Sheets

(51) Int. Cl.
- *G06N 3/045* (2023.01)
- *G06N 3/08* (2023.01)
- *G06T 3/40* (2024.01)
- *G06T 7/11* (2017.01)
- *G06T 7/149* (2017.01)
- *G06V 10/40* (2022.01)
- *G06V 10/764* (2022.01)
- *G06V 10/82* (2022.01)

(52) U.S. Cl.
CPC ............... *G06N 3/08* (2013.01); *G06T 3/40* (2013.01); *G06T 7/11* (2017.01); *G06T 7/149* (2017.01); *G06V 10/40* (2022.01); *G06V 10/764* (2022.01); *G06V 10/82* (2022.01); *G06T 2207/20081* (2013.01); *G06T 2207/20084* (2013.01); *G06T 2207/30201* (2013.01)

(58) Field of Classification Search
CPC . G06T 2207/20081; G06T 2207/20084; G06T 7/11; G06T 2207/30201; G06N 3/08; G06N 3/045; G06F 18/2415
See application file for complete search history.

(56) References Cited

OTHER PUBLICATIONS

Shi, W. et al., "Multi-Scale Convolutional Neural Networks," 2017 IEEE Visual Communications and Image Processing (VCIP), 2017, pp. 1-4. (Year: 2017).*

Selvaraju, R. R. et al., "Grad-CAM: Visual Explanations from Deep Networks via Gradient-based Localization," CVF Open Access, 2017, pp. 618-626. (Year: 2017).*

International Search Report and Written Opinion issued Jan. 19, 2022 in International Application No. PCT/CN2021/124337 with English Translation (8 pages).

Zhao, Junjie, et al. "Deep Image Clustering with Category-Style Representation." arXiv preprint arXiv:2007.10004 (2020).

Selvaraju, Ramprasaath R., et al. "Grad-cam: Visual explanations from deep networks via gradient-based localization." Proceedings of the IEEE international conference on computer vision. 2017.

Extended European Search Report received for EP Patent Application No. 21905262.8, mailed on Feb. 21, 2024, 13 pages.

Shi, et. al., "Segmentation quality evaluation based on multi-scale convolutional neural networks", 2017 IEEE Visual Communications and Image Processing (VCIP), Dec. 2017, 4 pages.

Xue, et al., "Adversarial learning with multi-scale loss for skin lesion segmentation", 2018 IEEE 15th International Symposium on Biomedical Imaging (ISBI 2018), IEEE, Apr. 2018, pp. 859-863.

* cited by examiner

201

Call an encoder to perform feature extraction on a sample image and a scale image to obtain a sample image feature of the sample image and a scale image feature of the scale image, the scale image including: at least one of an image obtained by magnifying the sample image or an image obtained by reducing the sample image

202

Perform class activation graph calculation based on the sample image feature to obtain a sample class activation graph of the sample image, and perform class activation graph calculation based on the scale image feature to obtain a scale class activation graph of the scale image, the class activation graph being used for indicating contribution values of pixels in an image to a classification result of the image

203

Call the decoder to decode the sample image feature to obtain a sample segmentation result of the sample image, and call the decoder to decode the scale image feature to obtain a scale segmentation result of the scale image, the sample segmentation result including classification probability values of pixels in the sample image

204

Calculate a class activation graph loss based on the sample class activation graph, the sample segmentation result, the scale class activation graph, and the scale segmentation result, and calculate a scale loss based on the sample segmentation result and the scale segmentation result, the class activation graph loss being used for training the decoder to enable the sample segmentation result to be close to the sample class activation graph, and to enable the scale segmentation result to be close to the scale class activation graph, and the scale loss being used for training the decoder to enable the sample segmentation result to be close to the scale segmentation result

205

Train the decoder based on the class activation graph loss and the scale loss

FIG. 2

USING TRAINING IMAGES AND SCALED TRAINING IMAGES TO TRAIN AN IMAGE SEGMENTATION MODEL

RELATED APPLICATIONS

This application is a continuation of International Application No. PCT/CN2021/124337, entitled "TRAINING METHOD AND APPARATUS FOR IMAGE SEGMENTATION MODEL, IMAGE SEGMENTATION METHOD AND APPARATUS, AND DEVICE" and filed on Oct. 18, 2021, which claims priority to Chinese Patent Application No. 202011487554.0, entitled "METHOD FOR TRAINING IMAGE SEGMENTATION MODEL, IMAGE SEGMENTATION METHOD, APPARATUS, AND DEVICE" and filed on Dec. 16, 2020. The entire disclosures of the prior applications are hereby incorporated by reference.

FIELD OF THE TECHNOLOGY

This application relates to the field of image segmentation, including a method for training an image segmentation model, an image segmentation method, apparatus, and device.

BACKGROUND OF THE DISCLOSURE

Image segmentation refers to dividing an image into a plurality of disjointed areas according to features such as gray scale, color, spatial texture, and geometric shape, so that these features show consistency or similarity in the same area, and show remarkable differences between different areas. Image segmentation may be used to separate a foreground target from a background in an image.

In the related art, a threshold method is used for image segmentation. The basic idea of the threshold method is to calculate one or more grayscale thresholds based on grayscale features of an image, compare a grayscale value of each pixel in the image with a threshold, and finally classify pixels into appropriate categories according to comparison results. Therefore, the most critical step of the method is to determine an optimal gray threshold according to a specific criterion function.

By the method in the related art, a target needs to have a remarkable edge or grayscale difference, target determining can only be performed based on shallow features such as image pixel values, and the precision is low.

SUMMARY

In an embodiment, a method for training an image segmentation model, the image segmentation model including an encoder and a decoder, includes calling the encoder to perform feature extraction on a sample image and a scale image to obtain a sample image feature of the sample image and a scale image feature of the scale image. The scale image includes an image obtained by magnifying the sample image or an image obtained by reducing the sample image. The method also includes performing a class activation graph calculation based on the sample image feature to obtain a sample class activation graph of the sample image, and performing the class activation graph calculation based on the scale image feature to obtain a scale class activation graph of the scale image. The sample class activation graph and the scale class activation graph indicate contribution values of pixels in the sample image and the scale image, respectively, to a classification result of the sample image and the scale image, respectively. The method further includes calling the decoder to decode the sample image feature to obtain a sample segmentation result of the sample image, and calling the decoder to decode the scale image feature to obtain a scale segmentation result of the scale image. The sample segmentation result includes classification probability values of pixels in the sample image and the scale segmentation result includes classification probability values of pixels in the scale image. The method further includes calculating a class activation graph loss based on the sample class activation graph, the sample segmentation result, the scale class activation graph, and the scale segmentation result, and calculating a scale loss based on the sample segmentation result and the scale segmentation result. The method also includes training the decoder based on the class activation graph loss and the scale loss, the class activation graph loss being used for training the decoder to enable the sample segmentation result to correspond to the sample class activation graph, and to enable the scale segmentation result to correspond to the scale class activation graph. The scale loss is used for training the decoder to enable the sample segmentation result to correspond to the scale segmentation result.

In an embodiment, an image segmentation method includes obtaining an input image, and calling an encoder to perform feature extraction on the input image to obtain an input image feature of the input image. The method further includes calling a decoder to decode the input image feature to obtain an image segmentation result of the input image, the decoder being obtained through training according to a class activation graph loss and a scale loss. The class activation graph loss is calculated based on a training sample class activation graph, a training sample segmentation result, a scale class activation graph, and a scale segmentation result. The training sample segmentation result includes classification probability values of pixels in a training image and the scale segmentation result comprising classification probability values of pixels in a scale image obtained by magnifying the training image or reducing the training image. The training sample class activation graph indicates contribution values of pixels in the training image to a classification result of the training image, the scale class activation graph indicates contribution values of pixels in the scale image to a classification result of the scale image. The class activation graph loss is used for training the decoder to output a segmentation result corresponding to a class activation graph, and the scale loss is used for training the decoder to output corresponding segmentation results for a plurality of images having identical image content and different scales.

In an embodiment, an apparatus for training an image segmentation model, the image segmentation model including an encoder and a decoder, includes processing circuitry configured to call the encoder to perform feature extraction on a sample image and a scale image to obtain a sample image feature of the sample image and a scale image feature of the scale image. The scale image includes an image obtained by magnifying the sample image or an image obtained by reducing the sample image. The processing circuitry is further configured to perform a class activation graph calculation based on the sample image feature to obtain a sample class activation graph of the sample image, and perform the class activation graph calculation based on the scale image feature to obtain a scale class activation graph of the scale image. The sample class activation graph and the scale class activation graph indicating contribution values of pixels in the sample image and the scale image, respectively, to a classification result of the sample image and the scale image, respectively. The processing circuitry is further configured to call the decoder to decode the sample image feature to obtain a sample segmentation result of the sample image, and call the decoder to decode the scale image feature to obtain a scale segmentation result of the scale image. The sample segmentation result including classification probability values of pixels in the sample image and the scale segmentation result comprising classification probability values of pixels in the scale image. The processing circuitry is further configured to calculate a class activation graph loss based on the sample class activation graph, the sample segmentation result, the scale class activation graph, and the scale segmentation result, and calculate a scale loss based on the sample segmentation result and the scale segmentation result. The processing circuitry is further configured to train the decoder based on the class activation graph loss and the scale loss. The class activation graph loss is used for training the decoder to enable the sample segmentation result to correspond to the sample class activation graph, and to enable the scale segmentation result to correspond to the scale class activation graph. The scale loss being used for training the decoder to enable the sample segmentation result to correspond to the scale segmentation result.

BRIEF DESCRIPTION OF THE DRAWINGS

To describe the technical solutions in the embodiments of this disclosure, the following briefly introduces the accompanying drawings describing the embodiments. The accompanying drawings in the following description show merely some embodiments of this disclosure, and a person of ordinary skill in the art may still derive other drawings from these accompanying drawings.

FIG. 2 is a method flowchart of a method for training an image segmentation model according to another exemplary embodiment of this disclosure.

DESCRIPTION OF EMBODIMENTS

To explain the objectives, technical solutions, and advantages of this disclosure, the following further describes the implementations of this disclosure in detail with reference to the accompanying drawings.

Figure 1:
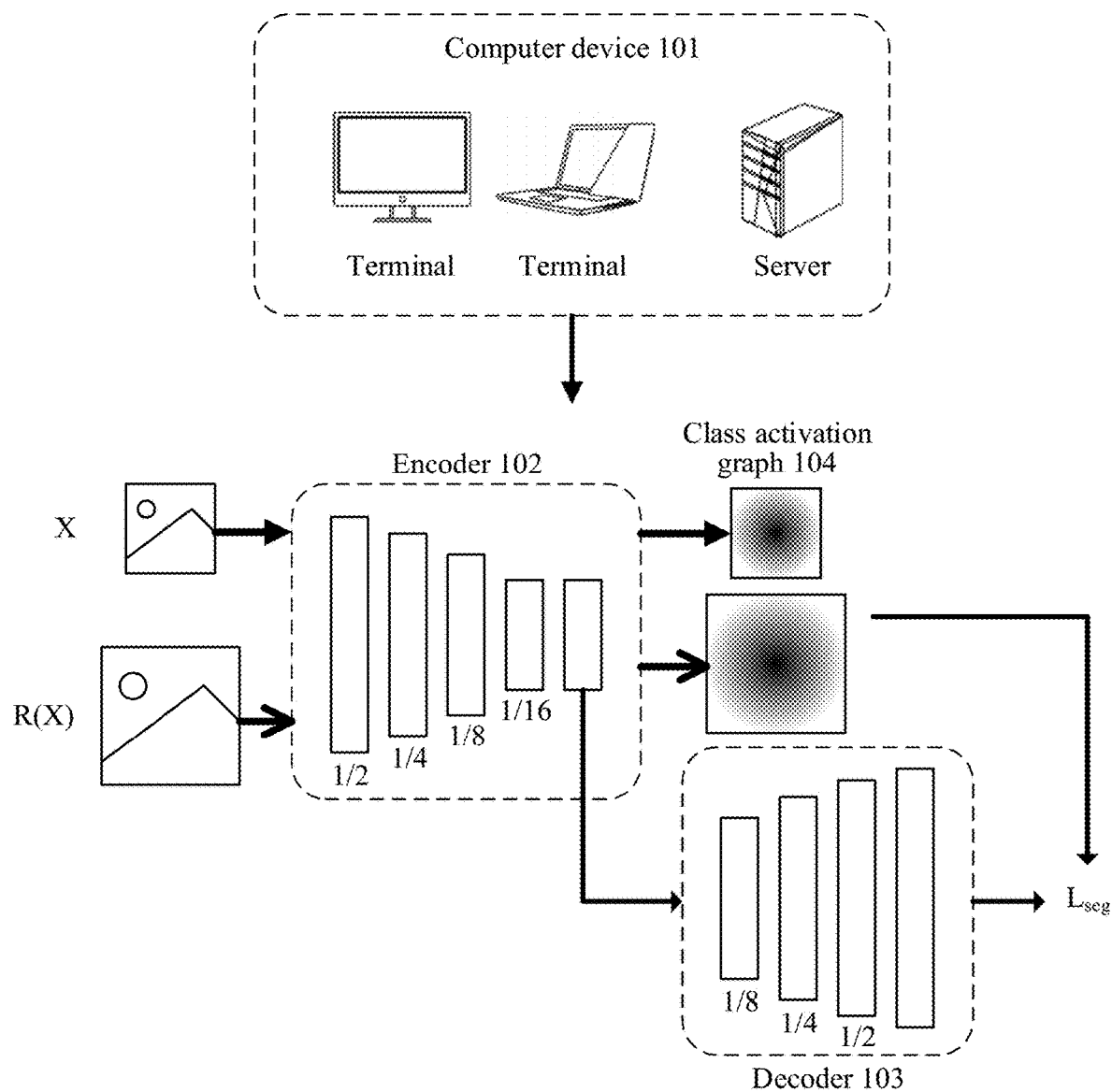
FIG. 1 is a block diagram of a computer device according to an exemplary embodiment of this disclosure.

FIG. 1 is a schematic diagram of a computer device 101 according to an exemplary embodiment of this disclosure. The computer device 101 may be a terminal or a server.

A terminal may include at least one of a smartphone, a laptop computer, a desktop computer, a tablet computer, a smart speaker, an in-vehicle terminal, and an intelligent robot. In an implementation, the terminal is installed with a client supporting an image segmentation function. For example, the client supporting an image segmentation function may be an image processing application, or a client of a video processing application. For example, the image segmentation function is provided in the image processing application program and is used for intelligently identifying a human face area in an image, to automatically perform image optimization on the human face area. Alternatively, a target batch modification function is provided in the video processing application and is used for intelligently identifying a target (a person, a plant, an animal, an object, and the like) in each frame of a video, to perform unified image processing on the target in each frame of image, for example, adjust color, brightness, saturation, and the like.

Exemplarily, the terminal stores an image segmentation model, and in a case that the client needs to use the image segmentation function, the client may call the image segmentation model to complete image segmentation. For example, in a case that a user needs to perform image optimization on a target image, the client calls the image segmentation model to perform image segmentation on the target image, to obtain a target area in the target image and to automatically optimize the target area.

The terminal and the server are connected to each other through a wired or wireless network.

Exemplarily, the method provided in this disclosure may be performed by a client on a terminal, or may be performed by a server. That is, training of the image segmentation model may be completed by a client or by a server. Exemplarily, in an application stage after training of the image segmentation model is completed, image segmentation may be performed by calling, by the client, the locally stored image segmentation model; image segmentation may be performed by transmitting, by the client, an image segmentation request to the server, so that the server calls the image segmentation model; or image segmentation may be performed by calling, by the server, the image segmentation model in a case that the server needs to perform image segmentation on a received image.

The terminal includes a first memory and a first processor. The first memory stores an image segmentation model; and the image segmentation model is called by a first processor to implement the method for training an image segmentation model provided in this disclosure. The first memory may include but is not limited to the following: a random access memory (FRAM), a read only memory (ROM), a programmable read-only memory (PROM), an erasable programmable read-only memory (EPROM), or an electric erasable programmable read-only memory (EEPROM).

The first processor may be composed of one or more integrated circuit chips. The first processor may be a general-purpose processor, such as a central processing unit (CPU) or a network processor (NP). The first processor may implement the method for training an image segmentation model provided in this disclosure by running a program or code.

The server includes a second memory and a second processor. The second memory stores an image segmentation model, and the image segmentation model is called by the second processor to implement the method for training an image segmentation model provided in this disclosure. Exemplarily, the server receives and stores user data transmitted by the terminal, and annotates an information object based on the user data. The second memory may include, but is not limited to, RAM, ROM, PROM, EPROM, and EEPROM. The second processor can be a general-purpose processor, such as a CPU or an NP.

Exemplarily, the image segmentation model stored in the terminal or the server includes an encoder 102 and a decoder 103.

Exemplarily, the computer device calls the encoder 102 to perform feature extraction on a sample image X and a scale image R(X) to obtain a sample image feature of the sample image X and a scale image feature of the scale image R(X). The scale image R(X) is an image obtained by upsampling the sample image X; that is, a size of the scale image R(X) is two times of the size of the sample image X.

A class activation graph 104 is calculated based on the sample image feature to obtain a sample class activation graph of the sample image, and the class activation graph 104 is calculated based on the scale image feature to obtain a scale class activation graph of the scale image. The class activation graph 104 is used for indicating contribution values of pixels in an image to a classification result of the image.

The decoder 103 is called to decode a sample image feature to obtain a sample segmentation result of the sample image, and is called to decode the scale image feature to obtain a scale segmentation result of the scale image. The sample segmentation result includes classification probability values of pixels in the sample image.

A loss $L_{seg}$ is calculated based on the sample class activation graph, the sample segmentation result, the scale class activation graph, and the scale segmentation result. The loss $L_{seg}$ includes a class activation graph loss and a scale loss. The class activation graph loss is used for training the decoder to enable the sample segmentation result to be close to the sample class activation graph, and to enable the scale segmentation result to be close to the scale class activation graph. The scale loss is used for training the decoder to enable the sample segmentation result to be close to the scale segmentation result.

The decoder 103 is trained based on the class activation graph loss and the scale loss.

FIG. 2 is a flowchart of a method for training an image segmentation model according to another exemplary embodiment of this disclosure. The method may be performed by a computer device, for example, by the computer device shown in FIG. 1. The method includes the following steps.

In step 201, an encoder is called to perform feature extraction on a sample image and a scale image to obtain a sample image feature of the sample image and a scale image feature of the scale image, the scale image including: at least one of an image obtained by magnifying the sample image or an image obtained by reducing the sample image.

Exemplarily, the image segmentation model includes an encoder and a decoder. The image segmentation model is used for segmenting an input image to obtain an area where a classification target is located in the image. The image segmentation model may be used for identifying at least one type of classification targets. For example, the image segmentation model may be used for identifying pixels where a cat, a dog, or a human is located in the image.

Exemplarily, in a case that the image segmentation model is used for segmenting N classification targets in an image, the image segmentation model may output, according to the input image, N probability values at which each pixel in the image pertains to the N classification targets, and further N classification probability graphs for the image to pertain to the N classification targets may be obtained, a pixel value of each pixel in an $i^{th}$ classification probability graph being a probability value at which the pixel pertains to an $i^{th}$ classification target, N being a positive integer, and i being a positive integer less than or equal to N.

Exemplarily, a classification target to which each pixel in an image pertains can be determined according to N classification probability graphs of the image. For example, a classification target having the greatest probability value among N probability values of a pixel is determined as the classification target to which the pixel pertains. For example, probability values at which a pixel pertains to a cat, a dog, and a human respectively are 0.1, 0.2, and 0.7, the classification target to which the pixel pertains is a human. Exemplarily, an output of the image segmentation model may be a classification target graph of an image, and a value of each pixel on the classification target graph represents a classification target to which the pixel pertains. Therefore, locations (pixels) of the classification targets may be seen on the classification target graph.

In summary, a segmentation result outputted by the image segmentation model may be the N classification probability graphs or may be the classification target graphs.

For an image, magnifying or reducing the image does not change location distribution of classification targets in the image, and therefore, an image segmentation result of a magnified or reduced image needs to be the same as a raw image (the segmentation result is scaled to the same scale). Therefore, the method provided in this embodiment is based on this idea to train an image segmentation network, so that the image segmentation network enables output segmentation results of a raw image and a scaled image to be close to each other.

Therefore, during obtaining of training samples for the image segmentation model, sample images and scale images corresponding to the sample images need to be obtained, the scale images including at least one of a magnified sample image and a reduced sample image. Exemplarily, the method for magnifying the sample image may be upsampling, and the method for reducing the sample image may be downsampling.

That is, a group of training samples includes at least one of the following three combinations:1) a sample image, and a magnified scale image obtained by upsampling the sample image; 2) a sample image, and a reduced scale image obtained by downsampling the sample image; or 3) a sample image, a magnified scale image obtained by upsampling the sample image, and a reduced scale image obtained by downsampling the sample image.

Exemplarily, for the steps of the method of this embodiment, the method for training an image segmentation model provided in this disclosure is described by an example of one group of training samples, and based on the method provided in this embodiment, iterative training may be performed on the image segmentation model by using a plurality of groups of training samples.

Exemplarily, after obtaining a sample image and a scale image, the sample image and the scale image are inputted to an encoder to perform feature extraction separately, to obtain a sample image feature of the sample image and a scale image feature of the scale image.

Exemplarily, the encoder used in this embodiment is an encoder that has been trained and has a relatively high feature extraction capability. In the training method of this embodiment, the decoder of the image segmentation model is trained, and the encoder is not trained. The encoder may be an encoder in any trained image classification model. The image classification model is used for outputting, according to an input image, a classification target to which the image pertains. Exemplarily, the classification target identified by the image classification model is the same as the classification target identified by the image segmentation model, that is, the image classification model is also used for identifying N classification targets.

Exemplarily, the encoder is a Convolutional Neural Network (CNN), and its specific network structure may be adjusted according to a size of an image.

In step 202, class activation graph calculation is performed based on the sample image feature to obtain a sample class activation graph of the sample image, and class activation graph calculation is performed based on the scale image feature to obtain a scale class activation graph of the scale image. The sample class activation graph and the scale class activation graph indicate contribution values of pixels in the sample image and the scale image, respectively, to a classification result of the sample image and the scale image, respectively.

Exemplarily, the encoder is an encoder in a trained image classification model and the image feature extracted by the encoder already has feature information for classifying the image, and therefore pixels based on which the image classification model classifies the image can be obtained by performing a class activation graph calculation based on the image feature outputted by the encoder. The decoder is trained by using the class activation graph, so that the image segmentation result outputted by the decoder is close to the class activation graph.

In step 203, the decoder is called to decode the sample image feature to obtain a sample segmentation result of the sample image, and the decoder is called to decode the scale image feature to obtain a scale segmentation result of the scale image. The sample segmentation result includes classification probability values of pixels in the sample image. The scale segmentation result includes classification probability values of pixels in the scale image.

Exemplarily, the decoder is configured to decode the image features outputted by the encoder, to obtain segmentation results.

Exemplarily, the decoder is composed of a plurality of layers of convolutional neural networks. Generally, the decoder adopts a network structure that is reciprocal to that of the encoder. For example, the encoder includes four convolutional blocks, each convolutional block is composed of two convolutional layers, and sizes of convolutional kernels are all 3*3. After each convolutional block, a pooling layer having a kernel size of 2*2 is connected to the encoder, to change an image feature outputted by the convolutional block to ½ of the original image feature. Correspondingly, the decoder may also include four convolutional blocks, each convolutional block is composed of two convolutional layers, and sizes of convolutional kernels are all 3*3. Before each convolutional block, an upsampling layer is connected to the decoder, to change the size of the image feature to two times of that of the original image feature. In this way, the size of the image inputted to encoder is the same as that of the image outputted by the decoder.

In step 204, a class activation graph loss is calculated based on the sample class activation graph, the sample segmentation result, the scale class activation graph, and the scale segmentation result, and a scale loss is calculated based on the sample segmentation result and the scale segmentation result. The class activation graph loss is used for training the decoder to enable the sample segmentation result to be close to (correspond to) the sample class activation graph, and to enable the scale segmentation result to be close to (correspond to) the scale class activation graph. The scale loss is used for training the decoder to enable the sample segmentation result to be close to (correspond to) the scale segmentation result.

Exemplarily, the class activation graph and the class activation graph loss of the segmentation result are calculated based on the idea of enabling the segmentation result to be close to the class activation graph. The scale loss between the sample segmentation result and the scale segmentation result is calculated based on the idea that the segmentation result of the image after the scale change is kept unchanged.

In step 205, the decoder is trained based on the class activation graph loss and the scale loss.

Exemplarily, the decoder is trained based on the class activation graph loss and the scale loss, so that the decoder outputs a segmentation result based on the class activation graph, and the output result of the decoder is enabled to guarantee that the segmentation result of the image after a scale change is kept unchanged.

In summary, by the method provided in this embodiment, based on the idea that image segmentation results for a same image need to be kept unchanged after the image is scaled, a sample image and a scale image obtained after the sample image is scaled are separately inputted to an encoder and a decoder for image segmentation, to obtain image segmentation results of the two images, a scale loss can be calculated based on the two image segmentation results, and the encoder is trained by using the scale loss, so that the two image segmentation results are enabled to be close to each other to guarantee that the image segmentation results are kept unchanged after the image size changes. Based on the image features outputted by the encoder, class activation images of the two images are calculated separately. The class activation graph reflects main pixels based on which image classification is performed, and therefore the image segmentation result needs to be close to the class activation graph. A class activation graph loss is calculated by using the segmentation results of the images and the class activation graphs of the images, and the encoder is trained by using the class activation graph loss, to finally guarantee that the image segmentation result obtained after image scaling is kept unchanged while enabling the image segmentation result outputted by the encoder to be close to the class activation graph.

Exemplarily, an exemplary embodiment of calculating a class activation graph and a loss is provided.

Figure 3:
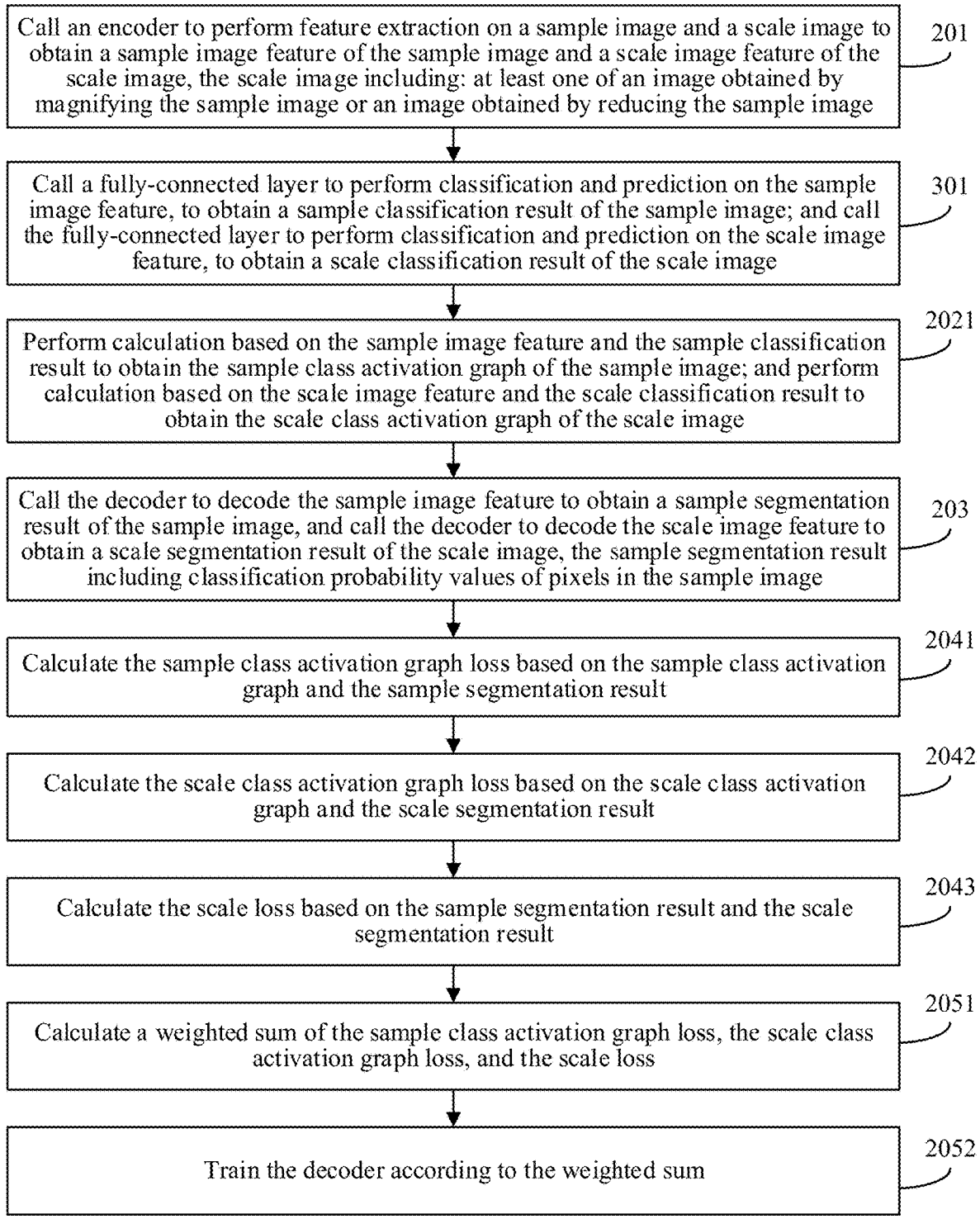
FIG. 3 is a method flowchart of a method for training an image segmentation model according to another exemplary embodiment of this disclosure.

FIG. 3 is a flowchart of a method for training an image segmentation model according to another exemplary embodiment of this disclosure. The method may be performed by a computer device, for example, a terminal or a server shown in FIG. 1. Based on the exemplary embodiment shown in FIG. 2, step 301 is further included before step 202, step 202 further includes step 2021, step 204 further includes step 2041 to step 2043, and step 205 further includes step 2051 and step 2052.

In step 301, a fully-connected layer is called to perform classification and prediction on the sample image feature, to obtain a sample classification result of the sample image; and the fully-connected layer is called to perform classification and prediction on the scale image feature, to obtain a scale classification result of the scale image.

Exemplarily, the image segmentation model further includes a pretrained fully-connected layer.

Exemplarily, the image classification model mentioned in step 201 in the embodiments shown in FIG. 2 further includes a fully-connected layer, that is, the image classification model includes an encoder and a fully-connected layer, and after the image is inputted to the encoder for feature extraction, a classification result is obtained through the fully-connected layer. The image segmentation model further adopts a fully-connected layer of an image classification model, and outputs respective classification results of the sample image and the scale image according to the image features outputted by the encoder.

Exemplarily, in a case that the image segmentation model and the image classification model are models used for identifying N classification targets, the classification result is a vector composed of N probability values at which the image pertains to the N classification targets.

In step 2021, calculation is performed based on the sample image feature and the sample classification result to obtain the sample class activation graph of the sample image; and calculation is performed based on the scale image feature and the scale classification result to obtain the scale class activation graph of the scale image.

Exemplarily, calculation formulas of the class activation graph are:

$$\alpha_i^c = \frac{1}{N \times M} \sum_{k=1}^{N} \sum_{j=1}^{M} \frac{\partial S_c}{\partial A_{kj}^i}$$

where c is a $c^{th}$ classification target in the N classification targets, $S_c$ is a probability value of a $c^{th}$ class in the classification result, N*M is a size of the image feature, $A_{kj}^i$ is a pixel value in a $k^{th}$ row and a $j^{th}$ column of the $i^{th}$ image feature, $\alpha_i^c$ indicates a contribution value of a pixel in the $k^{th}$ row and the $i^{th}$ column of the $i^{th}$ image feature to that the image is classified into an $i^{th}$ classification target.

$$L_{Grad-CAM}^c = \text{ReLU}\left(\sum_i \alpha_i^c A^i\right)$$

$L_{Grad-CAM}^c$ is a class activation graph in a case that the image is in the $c^{th}$ classification target; ReLU is an activation function, which indicates that the class activation graph focuses on pixels having probability values greater than 0, and $A^i$ is the $i^{th}$ image feature.

Exemplarily, in a case that the image segmentation model is used for identifying N classification targets, N class activation graphs of the image in the N classification targets can be calculated according to the calculation formulas, and an $i^{th}$ class activation graph is used for indicating contribution values of pixels in the image to that the image is classified into an $i^{th}$ classification target.

That is, the sample class activation graph includes N class activation graphs for indicating that the sample image is in the N classification targets; and the scale class activation graph includes N class activation graphs for indicating that the scale image is in the N classification targets.

In step 2041, the sample class activation graph loss is calculated based on the sample class activation graph and the sample segmentation result.

Exemplarily, the sample class activation graph loss is obtained through calculation based on an error between the sample segmentation result and the sample class activation graph. Exemplarily, a cross entropy of the sample class activation graph and the sample segmentation result is determined as the sample class activation graph loss.

A calculation formula for the sample class activation graph loss is in the following:

$$L_{seg,1} = -y_1 \log(s_1)$$

where $L_{seg,1}$ is the sample class activation graph loss, $y_1$ is the sample class activation graph, and $s_1$ is the sample segmentation result.

Exemplarily, the size of the class activation graph is different from that of the segmentation result, the class activation graph further needs to be upsampled to have the same size as the segmentation result, and the class activation graph loss is then calculated according to the foregoing formula. The size of the segmentation result is the same as that of a raw image inputted to the image segmentation model, that is, the size of the sample segmentation result is the same as that of the sample image. In addition, the class activation graph is calculated based on the image feature outputted by the encoder, the size of the class activation graph is the same as that of the image feature outputted by the encoder, and the size of the image feature is smaller than the raw image. Therefore, the size of the class activation graph is smaller than that of the segmentation result. For this, the class activation graph needs to be upsampled and magnified to the size of the segmentation result, and then a magnified class activation graph is substituted to the foregoing formula to calculate the class activation graph loss.

Exemplarily, the formula is a calculation formula for the sample class activation graph loss in a case that the number of classification targets of the image segmentation network is 1, and in a case that the number of classification targets of the image segmentation network is N, the calculation formula for the sample class activation graph loss is:

$$L_{seg,1} = \sum_{i=1}^{N}(-y_{1i}\log(s_{1i}))$$

where $L_{seg,1}$ is the sample class activation graph loss, $y_{1i}$ is a sample class activation graph of an $i^{th}$ classification target, and $s_{1i}$ is a sample segmentation result of the $i^{th}$ classification target.

In step 2042, the scale class activation graph loss is calculated based on the scale class activation graph and the scale segmentation result.

Exemplarily, the scale class activation graph loss is obtained through calculation based on an error between the scale segmentation result and the scale class activation graph. Exemplarily, a cross entropy of the scale class activation graph and the scale segmentation result is determined as the scale class activation graph loss.

A calculation formula for the scale class activation graph loss is in the following:

$$L_{seg,2} = -y_2 \log(s_2)$$

where $L_{seg,2}$ is the scale class activation graph loss, $y_2$ is the scale class activation graph, and $s_2$ is the scale segmentation result.

Exemplarily, the formula is a calculation formula for the scale class activation graph loss in a case that the number of classification targets of the image segmentation network is 1, and in a case that the number of classification targets of the image segmentation network is N, the calculation formula for the scale class activation graph loss is:

$$L_{seg,2} = \sum_{i=1}^{N}(-y_{2i}\log(s_{2i}))$$

where $L_{seg,2}$ is the scale class activation graph loss, $y_{2i}$ is a scale class activation graph of an $i^{th}$ classification target, and $s_{2i}$ is a scale segmentation result of the $i^{th}$ classification target.

Exemplarily, in a case that the scale image includes one of a reduced scale image and a magnified scale image, the foregoing formula may be used for calculating the scale class activation graph loss. In a case that the scale image includes two scale images, namely, a reduced scale image and a magnified scale image, the scale class activation graph loss includes a reduced scale class activation graph loss and a magnified scale class activation graph loss. Then, the foregoing formula is used for separately calculating a reduced scale class activation graph loss $L_{seg,2.1}$ of the reduced scale image and a magnified scale class activation graph loss $L_{seg,2.2}$ of the magnified scale image.

In step 2043, the scale loss is calculated based on the sample segmentation result and the scale segmentation result.

Exemplarily, because the size of the sample image is different from that of the scale image, a size of the outputted sample segmentation result is also different from that of the scale segmentation result, and therefore, in order to compare a difference between the two sizes, the sample segmentation result and the scale segmentation result need to be scaled to a same size. Exemplarily, because the structure of the encoder corresponds to that of the decoder, a size of the output segmentation result is the same as that of the input image size, and therefore, the sample segmentation result and the scale segmentation result are scaled to a same scale according to a scale relationship between the sample image and the scale image.

That is, the computer device scales, according to a scale relationship between the sample image and the scale image, the sample segmentation result to a same size as the scale segmentation result, to obtain a scaled sample segmentation result. The scale loss is calculated according to an error between the scale segmentation result and the scaled sample segmentation result.

For example, the scale image is an image obtained after upsampling and magnifying the sample image to two times. Then, the sample segmentation result is upsampled and magnified to two times to obtain the scaled sample segmentation result.

Exemplarily, a first matrix difference between the scale segmentation result and the scaled sample segmentation result is calculated, and a 2-norm of the first matrix difference is determined as the scale loss.

A calculation formula for the scale loss may be:

$$L_{seg,3} = \|s_2 - R(s_1)\|_2$$

where $L_{seg,3}$ is the scale loss, $s_2$ is the scale segmentation result, $s_1$ is the sample segmentation result, and $R(s_1)$ is the scaled sample segmentation result.

Exemplarily, the formula is a calculation formula for the scale loss in a case that the number of classification targets of the image segmentation network is 1, and in a case that the number of classification targets of the image segmentation network is N, the calculation formula for the scale loss is:

$$L_{seg,3} = \sum_{i=1}^{N}(\|s_{2i} - R(s_{1i})\|_2)$$

where $L_{seg,3}$ is the scale loss, $s_{2i}$ is a scale segmentation result of an $i^{th}$ classification target, $s_{1i}$ is a sample segmentation result of the $i^{th}$ classification target, and $R(s_{1i})$ is a scaled sample segmentation result of the $i^{th}$ classification target.

Exemplarily, in a case that the scale image includes one of a reduced scale image and a magnified scale image, the foregoing formula may be used for calculating the scale loss. In a case that the scale image includes two scale images, namely, a reduced scale image and a magnified scale image, the calculation formula for the scale loss is:

$$L_{seg,3} = \|s_4 - R_4(s_1)\|_2 + \|s_5 - R_5(s_1)\|_2$$

where $L_{seg,3}$ is the scale loss, $s_4$ is the reduced scale segmentation result of the reduced scale image, $s_5$ is the magnified scale segmentation result of the magnified scale image, $s_1$ is the sample segmentation result, $R_4(s_1)$ is a sample segmentation result obtained after reduction according to a scale relationship between the reduced scale image and the sample image, and $R_5(s_1)$ is a sample segmentation result obtained after magnification according to a scale relationship between the magnified scale image and the sample image.

Exemplarily, the formula is a calculation formula for the scale loss in a case that the number of classification targets of the image segmentation network is 1, and in a case that the number of classification targets of the image segmentation network is N, the calculation formula for the scale loss is:

$$L_{seg,3} = \sum_{i=1}^{N}(\|s_{4i} - R_4(s_{1i})\|_2 + \|s_{5i} - R_5(s_{1i})\|_2)$$

where $L_{seg,3}$ is the scale loss, $s_{4i}$ is a reduced scale segmentation result of a reduced scale image in an $i^{th}$ classification target, $s_{5i}$ is a magnified scale segmentation result of a magnified scale image in the $i^{th}$ classification target, and $s_{1i}$ is a sample segmentation result of the $i^{th}$ classification target; $R_4(S_{1i})$ is a sample segmentation result obtained after reducing the sample segmentation result of the $i^{th}$ classification target according to a scale relationship between the reduced scale image and the sample image; $R_5(s_{1i})$ is a sample segmentation result obtained after magnifying the sample segmentation result of the $i^{th}$ classification target according to a scale relationship between the magnified scale image and the sample image.

In step 2051, a weighted sum of the sample class activation graph loss, the scale class activation graph loss, and the scale loss is calculated.

Exemplarily, $L_{seg,1}$ and $L_{seg,2}$ represent that the segmentation results outputted by the constraint decoder is close to the corresponding class activation graph. $L_{seg,3}$ represents that a segmentation result of an image after a scale change needs to be consistent with a segmentation result of a raw image after the same scale change. Based on the three losses (the sample class activation graph loss, the scale class activation graph loss, and the scale loss), a total loss is calculated:

$$L_{seg}=L_{seg,1}L_{seg,2}\lambda L_{seg,3}$$

where $L_{seg}$ is the total loss, $L_{seg,1}$ is the sample class activation graph loss, $L_{seg,2}$ is the scale class activation graph loss, $L_{seg,3}$ is the scale loss, and $\lambda$ is a weight of the scale loss.

Exemplarily, the weight of the sample class activation graph loss is 1, the weight of the scale class activation graph loss is 1, and the weight of the scale loss is 2, that is, $\lambda=2$.

Exemplarily, in a case that the scale image includes one of a reduced scale image and a magnified scale image, the foregoing formula may be used for calculating the total loss. In a case that the scale image includes two scale images, namely, a reduced scale image and a magnified scale image, the scale class activation graph loss includes a reduced scale class activation graph loss and a magnified scale class activation graph loss. Then, the total loss is:

$$L_{seg}=L_{seg,1}+L_{seg,2.1}+L_{seg,2.1}+\lambda L_{seg,3}$$

where $L_{seg}$ is the total loss, $L_{seg,1}$ is the sample class activation graph loss, $L_{seg,2.1}$ is the scale class activation graph loss, $L_{seg,2.2}$ is the scale class activation graph loss, $L_{seg,3}$ is the scale loss, and is the weight of the scale loss.

In step 2052, the decoder is trained according to the weighted sum.

Exemplarily, the decoder is trained according to the calculated weighted sum (the total loss), the segmentation result is constrained to be close to the class activation graph, and the segmentation results of different sizes of the same image are constrained to be consistent.

Exemplarily, after completing the training of the image segmentation model, the image segmentation model may be used for image segmentation.

That is, the computer device calls the image segmentation model to segment an input image to obtain an image segmentation result, and the image segmentation model includes an encoder and a decoder.

For example, the encoder is called to perform feature extraction on the input image to obtain an input image feature of the input image; and the decoder is called to decode the input image feature to obtain an image segmentation result of the input image.

To sum up, in the method provided in this embodiment, feature extraction is performed by using an encoder of a pretrained image classification model, so that the image feature outputted by the encoder has feature information used for classification, the classification result of the image is outputted by using a fully-connected layer of the image classification model, and then the class activation graph of the image is obtained by using the classification result and the image feature. Although the class activation graph may also be outputted as an image segmentation result, the scale change of the image may greatly affect the class activation graph, and normally the scale change may not affect the image segmentation result. Therefore, based on the idea of image segmentation, two scales of a same image are introduced, and the decoder is trained by using an error between two segmentation results of the two scales, so that the decoder can guarantee that the segmentation results are kept unchanged after the scale change while accurately segmenting the image.

Exemplarily, the encoder and the fully-connected layer in the image segmentation model adopt an encoder and a fully-connected layer of a trained image classification model. Exemplarily, assuming that the encoder in the image classification model is a classification encoder and the fully-connected layer is a classification fully-connected layer, in an initialization stage of the image segmentation model, the computer device sets a parameter of the encoder according to a parameter of the classification encoder in a trained image classification model, and the classification target of the image classification model is the same as that of the image segmentation model. A parameter of the fully-connected layer is set according to a parameter of the classification fully-connected layer in a trained image classification model, and the image classification model is used for outputting a classification result according to the input image.

Provided is an exemplary embodiment of training an image classification model.

Figure 4:
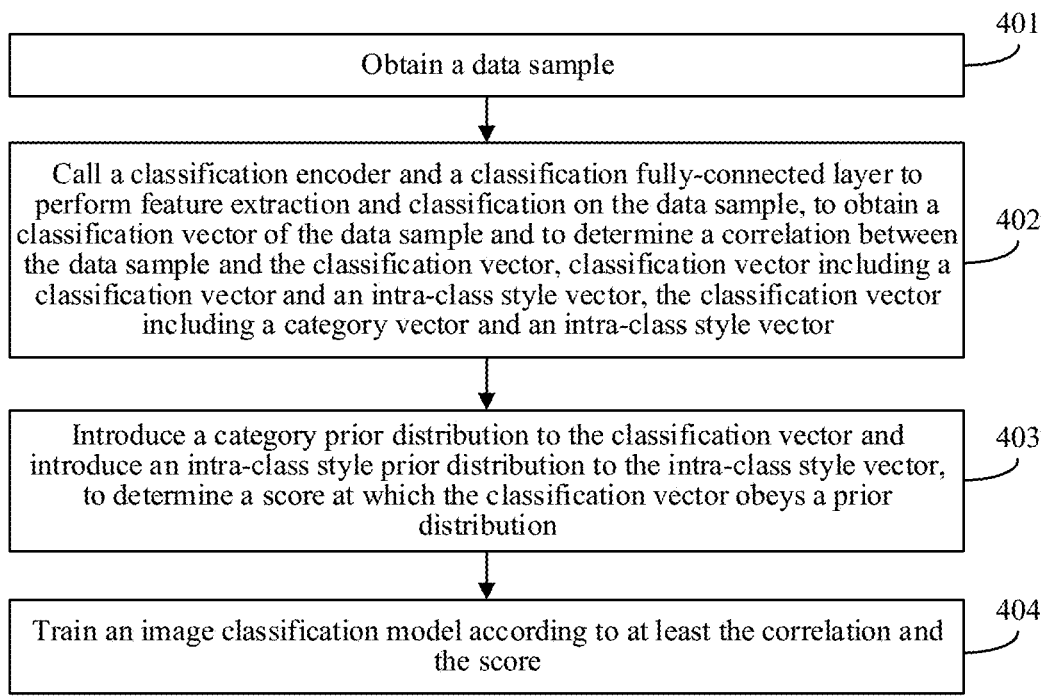
FIG. 4 is a method flowchart of a method for training an image classification model according to another exemplary embodiment of this disclosure.

FIG. 4 is a flowchart of a method for training an image segmentation model according to another exemplary embodiment of this disclosure. The method may be performed by a computer device, for example, a terminal or a server shown in FIG. 1. The method includes the following steps.

In step 401, a data sample is obtained.

In step 402, a classification encoder and a classification fully-connected layer are called to perform feature extraction and classification on the data sample, to obtain a classification vector of the data sample and to determine a correlation between the data sample and the classification vector, the classification vector including a category vector and an intra-class style vector.

The computer device obtains a data sample set. The data sample set includes data samples. The data samples are images. An image classification model is pre-established in the computer device, and the image classification model includes an encoder and a fully-connected layer connected behind the encoder. The image classification model may adopt a plurality of types of neural networks. For example, the image classification model may adopt a convolutional neural network, and convolutional blocks of the image classification model may be adjusted according to a size of an image. A greater image indicates a greater number of convolutional blocks. For example, for a 32*32 image, two convolutional blocks may be used, and for a 96*96 image, four convolutional blocks may be used.

The computer device inputs the data sample to the image classification model, the encoder of the image classification model performs feature extraction on the data sample to obtain a sample feature, and the fully-connected layer outputs a classification vector of the data sample according to the sample feature. The classification vector includes a category vector and an intra-class style vector. Elements in the category vector are probabilities at which the data sample pertains to classification targets. The intra-class style vector describes intra-class style information of the data sample. The computer device may train the image classification model by using another network model. The computer device may determine, by using a discriminator, a correlation between the data sample and the classification vector (the data sample corresponds to the classification vector obtained according to the data sample) and determine, by using an evaluator, a score at which the classification vector obeys a prior distribution. An overall network structure diagram of training the image classification model by the computer device may be shown in FIG. 5.

A discriminator 501 is a deep neural network composed of a plurality of fully-connected layers. For example, the discriminator 501 may be a deep neural network composed of three or more fully-connected layers.

An evaluator 502 is a deep neural network composed of a plurality of fully-connected layers. The evaluator 502 may be a deep neural network composed of three or more fully-connected layers.

Figure 5:
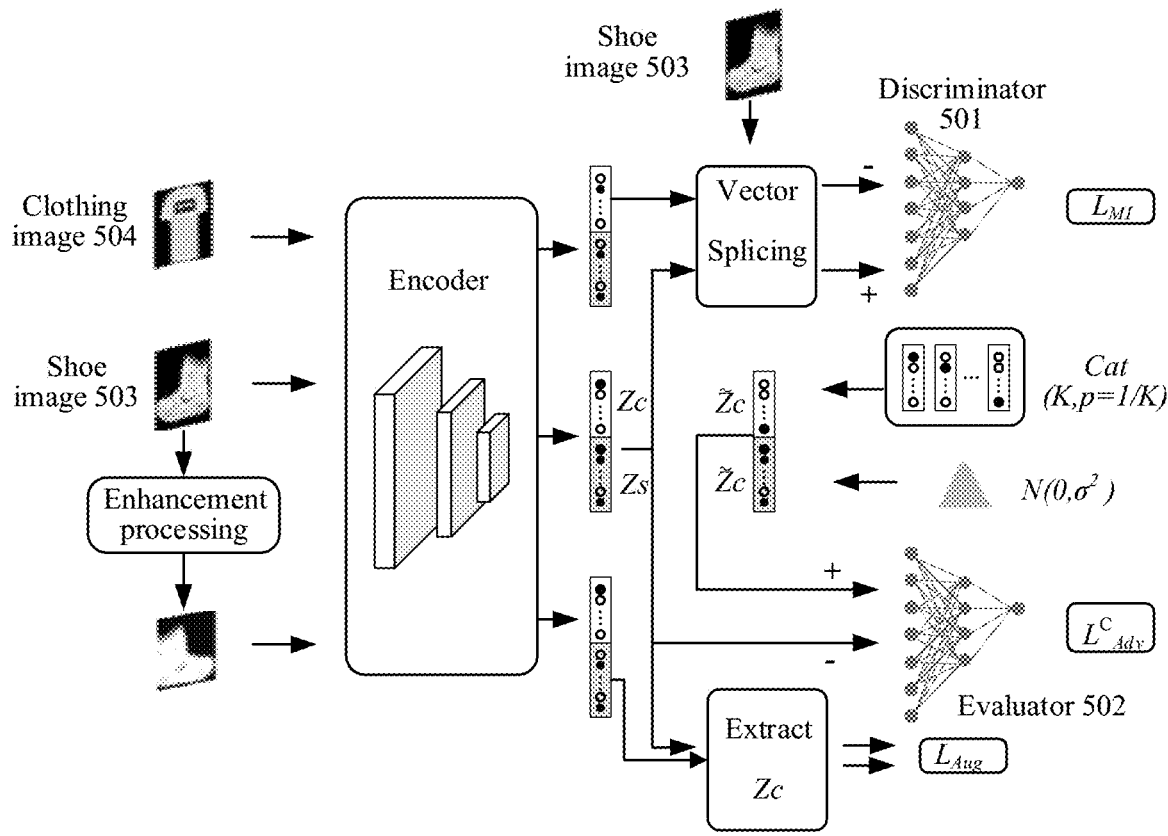
FIG. 5 is a schematic diagram of a method for training an image classification model according to another exemplary embodiment of this disclosure.

The discriminator 501 may determine whether a data sample is correlated with a classification vector, to maximize mutual information between the data sample and the classification vector. The computer device may input a data sample and an extracted classification vector to the discriminator 501 simultaneously. The data sample includes a first sample and a second sample. In a case that the data sample inputted to the discriminator 501 is the first sample, the extracted classification vector is from the second sample, and the first sample is different from the second sample, the first sample and the classification vector are negative samples and the discriminator 501 determines that the data sample and the classification vector are not correlated with each other. In a case that the data sample inputted to the discriminator 501 is the first sample and the extracted classification vector is from the first sample, the first sample and the extracted classification vector are positive samples and the discriminator 501 determines that data sample and the classification vector are correlated with each other. In FIG. 5, a shoe image 503 may be used as the first sample, a clothing image 504 may be used as the second sample, the encoder and the fully-connected layer obtain a first classification vector according to the inputted first sample and obtain a second classification vector according to the inputted second sample. The first sample is correlated with the first classification vector and the first sample is not correlated with the second classification vector. In a case that the discriminator 501 can correctly determine whether a data sample is correlated with a classification vector, it indicates that the classification vector includes information related to the data sample, and therefore mutual information can be maximized.

In step 403, a category prior distribution is applied to the category vector and an intra-class style prior distribution is applied to the intra-class style vector, to determine a score at which the classification vector obeys a prior distribution.

The evaluator introduces a prior distribution to the classification vector. The evaluator is also a deep neural network composed of a plurality of fully-connected layers. The evaluator 502 may be a deep neural network composed of three or more fully-connected layers.

The prior distribution includes a category prior distribution and an intra-class style prior distribution. The category prior distribution may be referred to as a category distribution for short, and the intra-class style prior distribution may be a Gaussian distribution. The evaluator introduces a category distribution $\tilde{Z}_c$ for a category vector $Z_c$ and introduces a Gaussian distribution $\tilde{Z}_s$ for an intra-class style vector $Z_s$ so that the category vector can be effectively decoupled from the intra-class style vector.

In a case that the classification vector obeys the prior distribution, the outputted category feature is enabled to be partially a single heat vector, so that an element having the greatest value in the single heat vector may be directly used to represent the category of the data sample, thereby avoiding a next classification operation. In addition, the data sample is prevented from being aggregated to one category or a few categories, but can be guaranteed to be aggregated to a required number of categories, for example, 10 categories.

In step 404, an image classification model is trained according to at least the correlation and the score.

The computer device may perform reverse optimization on a network parameter of the image classification model by using the correlation between the data sample and the classification vector and the score at which the classification vector obeys a prior distribution. A back propagation method may be used to optimize the network parameters in the image classification model. For example, the back propagation method may adopt an Adam-based gradient descent method. In a case that the image classification model is optimized in reverse, weight updating may be performed on the network parameters of the image classification model, the discriminator, and the evaluator. During training, a learning rate is 0.0001, a parameter $\beta_1$ which controls convergence of a loss function is set to 0.5, and $\beta_2$ is set to 0.9. A batch size is set to 64. In the reverse optimization process, the evaluator, the image classification model, and the discriminator may be optimized alternately with a same batch of data samples at a time. In a case that the loss function of the evaluator starts to converge, it indicates that the classification vector learned by the image classification model is close to the prior distribution and the training may be stopped.

In an embodiment, the method for training an image classification model further includes: performing enhancement on the data sample, and obtaining an enhanced classification vector through mapping by the image classification model, the enhanced classification vector including an enhanced category vector and an enhanced intra-class style vector; and determining a category feature difference between the category vector and the enhanced category vector; and the training an image classification model according to at least the correlation and the score includes: training the image classification model based on the correlation, the category feature difference, and the score.

The computer device inputs the data sample to the image classification model, and obtains a corresponding classification vector through the encoder and the fully-connected layer. The classification vector includes a category vector and an intra-class style vector. The category vector is a vector activated by a Softmax function, and elements in the vector represent probabilities at which the data sample pertains to classification targets, and a vector dimension is set to the number of the classification targets. The intra-class style vector is a linearly activated vector. The vector describes intra-class style information of the data sample, and a vector dimension may be a preset number, for example, 50. Exemplarily, the intra-class style information refers to style difference information which exists between images for a plurality of images pertaining to a same classification target. After different excitations, obtained values of the category vector and the intra-class style vector are different, but some information may be mixed. By introducing the category prior distribution to the category vector and the intra-class style prior distribution to the intra-class style vector, the category vector can be effectively decoupled from the intra-class style vector.

Because a same type of data samples may have different styles, a style change may not change a classification target to which a data sample pertains. That is, based on a phenomenon that specific data enhancement does not change a classification target to which a data sample pertains, in this embodiment, by performing data enhancement on the data sample and through training, the enhanced classification vector may not change. The computer device performs enhancement on the data sample. The enhancement includes random cropping of the image, random horizontal flipping, color jitter, and random combination of color channels. The enhanced data sample is inputted to the image classification model, and an enhanced classification vector is obtained through the encoder and the fully-connected layer. The computer device extracts a category vector from the classification vector, extracts an enhanced category vector from the enhanced classification vector, inputs the category vector and the enhanced category vector to the evaluator, and identifies a category feature difference between the category vector and the enhanced category vector through the evaluator. Elements in the vector of the category vector are probability values at which the data sample pertains to classification targets. The category feature difference between the category vector and the enhanced category vector may be measured by divergence.

The computer device may perform reverse optimization on a network parameter of the image classification model by using the correlation between the data sample and the classification vector, the score at which the classification vector obeys the prior distribution, and the category feature difference between the category vector and the enhanced category vector. In the process of back propagation of the network, weight values corresponding to the network parameters of the image classification model, the discriminator, and the evaluator are updated. In this way, the image classification model may learn that the classification vector is correlated with a data sample, that the category vector may represent a classification target of the data sample, and that the intra-class style vector may represent a difference between the same type of data samples. After data enhancement, the category vector of the data sample is kept unchanged, that is, the style of the data sample may change to an extent, but the data sample still pertains to the same category. Moreover, due to the introduction of a constraint of the prior distribution, the category vector may be enabled to be close to the single heat vector as much as possible, that is, values of most elements are close to 0, a value of one element is close to 1, so that the classification target corresponding to the data sample can be directly determined according to the category vector.

In an embodiment, the data sample includes a first sample and a second sample; and the determining a correlation between the data sample and the classification vector includes: obtaining the first sample, splicing a classification vector of the first sample and a first sample vector, to generate a first sample vector (a positive sample) after the splicing; splicing a classification vector of the second sample and the first sample vector, to generate a second sample vector (a negative sample) after the splicing; and training the discriminator to output a "correlated" result according to the first sample vector and an "uncorrelated" result according to the second sample vector.

The data sample includes a first sample and a second sample, and the first sample and the second sample may be completely different or the same. The first sample is inputted to the image classification model, for mapping, to obtain a first classification vector corresponding to the first sample. The second sample is inputted to the image classification model, for mapping, to obtain a second classification vector corresponding to the second sample. Both the first classification vector and the second classification vector may be vectors having a plurality of dimensions, for example, 50 dimensions. The computer device converts the first sample into a first sample vector. The computer device splices the first classification vector and the first sample vector, to generate a first sample vector after the splicing. The splicing may be performed by adding a first sample vector behind the first classification vector, or may be performed by adding a first classification vector behind the first sample vector. The computer device may splice the second classification vector and the first sample vector by using the splicing method, to generate a spliced second sample vector. The spliced first sample vector is inputted to the discriminator, and the discriminator outputs "1" after determining that the two are correlated and outputs "0" after determining that the two are uncorrelated; and the spliced second sample vector is inputted to the discriminator, and the discriminator outputs "1" after determining that the two are correlated and outputs "0" after determining that the two are uncorrelated. In a case that the discriminator can correctly determine whether a data sample is correlated with a classification vector, it indicates that the classification vector includes information related to the data sample, to maximize the mutual information, and therefore the classification vector learned by the image classification model can be enabled to be correlated with the data sample.

In an embodiment, the introducing a category prior distribution to the category vector and introducing an intra-class style prior distribution to the intra-class style vector, to determine a score at which the classification vector obeys a prior distribution includes: introducing the category prior distribution to the category vector by the evaluator, to obtain a category distribution result of the category vector; introducing the intra-class style prior distribution to the intra-class style vector by the evaluator, to obtain an intra-class style prior distribution result of the intra-class style vector; and scoring the category distribution result and the intra-class style prior distribution result by the evaluator, to obtain the score at which the classification vector obeys a prior distribution.

The evaluator introduces a prior distribution to the classification vector. The prior distribution includes a category prior distribution and an intra-class style prior distribution. The category prior distribution may be referred to as a category distribution for short, and the intra-class style prior distribution may be a Gaussian distribution. The category distribution may be $\tilde{Z}_c \sim \text{Cat}(K, p=1/K)$, where $\tilde{Z}_c$ is a distribution of the category vector, Cat is the category distribution, which is a single heat vector, K is the number of classification targets, and P is a reciprocal of K. The intra-class style vector may be $\tilde{Z}_s \sim N(0, \sigma^2)$, $\tilde{Z}_s$ is a distribution of the intra-class style vector, N is a Gaussian distribution, $\sigma$ is a standard deviation, and $\sigma$ may be a preset value, for example, 0.1.

The computer device inputs both the category vector and the intra-class style vector to the evaluator, and the evaluator outputs a category distribution result corresponding to the category vector and a Gaussian distribution result corresponding to the intra-class style vector. The category distribution result may be a category vector, and the category vector may be a single heat vector. The Gaussian distribution result may be a style vector.

In an embodiment, the scoring the category distribution result and the intra-class style prior distribution result by the evaluator includes: splicing the category distribution vector of the category vector and the Gaussian distribution vector of the intra-class style vector, to generate a prior distribution vector; and scoring the prior distribution vector by the evaluator, to obtain the score at which the classification vector obeys a prior distribution.

The computer device splices the category result and the Gaussian distribution result, that is, splices the corresponding category vector and style vector. The splicing may be performed by adding an element of the style vector behind the last element of the category vector, or may be performed by adding an element of the style vector behind the last element of the category vector. The evaluator scores the spliced vector to obtain a corresponding score, which is a probability at which the classification vector obeys a prior distribution. A higher probability indicates a higher tendency for which the classification vector obeys the prior distribution. In a case that the classification vector obeys the prior distribution, the outputted category vector may be enabled to be close to the single heat vector as much as possible, so that an element having the greatest value in the single heat vector may be directly used to represent the category of the data sample, thereby avoiding a next classification operation. In addition, in a case of obeying the prior distribution, the data sample is prevented from being classified to one category or a few categories, but can be guaranteed to be classified to required classification targets.

In an embodiment, the method for training an image classification model further includes: determining, by a discriminator, a correlation between the data sample and the classification vector; and determining, by an evaluator, a score at which the classification vector obeys a prior distribution; and the training an image classification model according to at least the correlation and the score includes: performing alternate optimization on the image classification model, the discriminator, and the evaluator according to at least the correlation and the score.

The correlation between the data sample and the classification vector is identified by the discriminator. A loss function for the discriminator to identify the correlation between the data sample and the classification vector may be referred to as a mutual information loss function. The discriminator may be trained by the mutual information loss function. The mutual information loss function may be indicated in the following:

$$L_{MI} = -(E_{(X,Z) \sim Q(Z|X)P_X(X)}[\log S(D(X,Z))] + E_{(X,Z) \sim Q_Z(Z)P_X(X)}[\log(1-S(D(X,Z)))])$$

where X is the data sample, Z is the classification vector, S is a sigmoid function, E represents an expectation, D is the discriminator, which is used for determining whether X and Z are correlated with each other, and Q (Z|X) is a posteriori distribution of Z obtained through mapping by the image classification model; and $P_X$ is a prior distribution of the input image, $Q_Z = E_{P_X}[Q(Z|X)]$ is an aggregated posteriori distribution of Z, and $E_{(X,Z) \sim Q(Z|X)P_X(X)}$ indicates a mathematical expectation at which X and Z obey Q (Z|X)$P_X$(X). In a case that X and Z are positive samples, $E_{(X,Z) \sim Q_Z(Z)P_X(X)}[\log(1-S(D(X,Z)))] = 0$, and in a case that X and Z are negative samples, $E_{(X,Z) \sim Q(Z|X)P_X(X)}[\log S(D(X,Z))] = 0$.

In the process of training the discriminator by using the mutual information loss function, a smaller value of the loss function indicates a more accurate determining of the correlation, and indicates a smaller impact on the weight of each layer in the discriminator network during reverse optimization. In a case that the discriminator can correctly determine whether a data sample is correlated with a feature, it indicates that the feature includes information correlated with the data sample, to maximize mutual information.

The category feature difference between the category vector and the enhanced category vector may be measured by divergence. The divergence may be KL divergence. The corresponding loss function may be referred to as a category difference loss function, using the following formula:

$$L_{Aug} = KL(Q(Z_c|X) \| Q(Z_c|T(X)))$$

where KL is the KL divergence, Q is the image classification model, $Z_c$ is the category vector, X is the data sample, T is the data enhancement, $Q(Z_c|X)$ is an aggregation posteriori distribution of $Z_c$, and $Q(Z_c|T(X))$ is a posteriori distribution of the enhanced classification vector.

A smaller function value of the category difference loss function indicates a smaller category feature difference between the category vector and the enhanced category vector, and correspondingly indicates a smaller probability at which the category vector changes after the data sample is undergone data enhancement.

A score at which the classification vector obeys the prior distribution is evaluated by an evaluator. A loss function is introduced to the prior distribution, and the classification vector may be referred to as a prior distribution loss function. Different prior distribution loss functions may be defined for the image classification model and the evaluator, respectively. Through the prior distribution loss function, the classification vector mapped by the image classification model may be enabled to be close to the prior distribution as much as possible. The prior distribution loss function of the image classification model may be in the following:

$$L_{Adv}^Q = -E_{Z \sim Q_Z}[C(Z)]$$

where Q is the image classification model, Z is the classification vector of the data sample, C(Z) is a probability value of whether the classification vector obeys the prior distribution, $Q_Z$ is an aggregated posteriori distribution of Z, and $E_{Z \sim Q_Z}[C(Z)]$ is a mathematical expectation at which Z obeys $Q_Z[C(Z)]$.

The prior distribution loss function of the evaluator may be in the following:

$$L_{Adv}^C = E_{Z \sim Q_Z}[C(Z)] - E_{Z \sim P_Z}[C(\tilde{Z})] + \lambda E_{Z \sim P_Z}[(\|\nabla_Z C(\tilde{Z})\|_2 - 1)^2]$$

where C is the evaluator, $P_Z$ is the prior distribution, $\hat{Z}$ is a feature on a connection line of features sampled from the prior distribution $P_Z$ and the aggregated posteriori distribution $Q_Z$, $(\|\nabla_Z C(\tilde{Z})\|_2 - 1)^2$ is a gradient penalty item, which is used for enabling the evaluator C to meet the Lipschitz constraint, so that the score obtained after being evaluated by the evaluator, that is, the probability of obeying the prior distribution, does not change excessive drastically, and λ is a gradient penalty item coefficient, which is set to 10.

In an embodiment, the mutual information loss function, the category difference loss function, and the prior distribution loss function of the image classification model may be used as loss sub-functions to define the total loss function of the image classification model. Each loss sub-function may have a corresponding weight. The total loss function of the discriminator may be defined by the mutual information loss function and its corresponding weight. The total loss function of the evaluator may be defined by the prior distribution loss function of the evaluator and its weight.

The total loss function of the image classification model is in the following:

The total loss function of the discriminator is in the following:

$$L^Q = \beta_{MI} L_{MI} + \beta_{Aug} L_{Aug} + \beta_{Adv} L_{Adv}^Q;$$

the total loss function of the discriminator is in the following:

$$L^D = \beta_{MI} L_{MI};$$

the total loss function of the evaluator is in the following:

$$L^C = \beta_{Adv} L_{Adv}^C;$$

where $L^Q$ is the total loss function of the image classification model, $L_{MI}$ is the mutual information loss function, $L_{Aug}$ is the category difference loss function, $L_{Adv}^Q$ is the prior distribution loss function of the image classification model, $\beta_{MI}$ is the weight of $L_{MI}$, $\beta_{Aug}$ is the weight of $L_{Aug}$, and $\beta_{Adv}$ is the weight of $L_{Adv}^Q$. $\beta_{MI}$ and $\beta_{Adv}$ may be set to corresponding fixed values, for example, $\beta_{MI}$ is set to 0.5 and $\beta_{Adv}$ is set to 1. $\beta_{Aug}$ is correlated with a data set of data samples and may be set by the following method. Further, the computer device may generate a corresponding visual dimension reduction graph by performing nonlinear dimension reduction on the classification vector, and select the weight of the category difference loss function according to the visual dimension reduction graph. The visual dimension reduction graph is a result of reducing high-dimensional data to low-dimensional data, so that the result is visual. Low dimensions are, for example, two or three dimensions. For example, a t-SNE may be used to perform nonlinear dimensionality reduction on the classification vector, and according to a processing result, a visual dimensionality reduction graph, that is, a t-SNE graph, is generated. In the t-SNE graph, data samples may be classified to form classification clusters. In a case that a value of $\beta_{Aug}$ is low, the classification clusters of the data samples are scattered. As the value of $\beta_{Aug}$ increases, obtained features tend to aggregate and the classification clusters may even overlap. Data sets of different data types have different classified results. For example, a data sample is an image. In a case that $\beta_{Aug}=2$, the classification clusters in the t-SNE graph do not overlap. In a case that $\beta_{Aug}=3$, the classification clusters in the t-SNE graph overlap. Therefore, a maximum value of overlapping of the classification clusters may be selected from a range of 2 to 3 as the value of $\beta_{Aug}$, and therefore the total loss function of the image classification model is enabled to be more accurate, so that the classification result of the trained image classification model is enabled to be more accurate.

The training of the image classification model may be performed by reverse optimization. During the reverse optimization, the evaluator, image classification model and discriminator may be optimized alternately. The evaluator is optimized first, and then the image classification model and the discriminator are optimized. Further, first, the total loss function of the evaluator is used to reversely optimize the evaluator, so that a probability of the classification vector that obeys the prior distribution is close to 1, and the probability of the classification vector that does not obey the prior distribution is close to 0. Then, the total loss function of the image classification model is used to reversely optimize the image classification model and the total loss function of the discriminator is used to reversely optimize the discriminator, so that the classification vector outputted by the image classification model may obtain a high score as much as possible, that is, the probability at which the classification vector obeys the prior distribution is as high as possible; the alternate optimization process is repeated, so that the classification vector outputted by the image classification model obtains a high score, that is, the probability at which the classification vector obeys the prior distribution is close to 1, thereby obeying the prior distribution.

In an embodiment, the performing alternate optimization on the image classification model, the discriminator, and the evaluator according to at least the correlation and the score includes: first optimizing a network parameter of the evaluator according to the score at least once; and then performing optimization on a network parameter of the image classification model according to at least the correlation and the score, and performing optimization on a network parameter of the discriminator according to the correlation.

Further, because there are a large number of data samples, all the data samples cannot be inputted to the image classification model for training at a time. During reverse optimization, data samples may be randomly divided into a plurality of batches, each batch has a fixed number of data samples, and may also be referred to as a batch sample. For example, the batch sample may be set to 64 data samples, that is, the batch size is set to 64.

During training, the computer device determines a score at which the classification vector obeys the prior distribution and determines a correlation between a data sample and a classification vector. During alternate optimization of the image classification model, the discriminator, and the evaluator, the weights corresponding to the network parameters are updated. First, after the network parameter of the evaluator is optimized at least once according to the score at which the classification vector obeys the prior distribution and the total loss function of the evaluator, a network parameter of the image classification model is optimized according to the correlation between the data sample and the classification vector, the score at which the classification vector obeys the prior distribution, the category feature difference, and the total loss function of the image classification model, and the network parameter of the discriminator is optimized according to the correlation between the data sample and the classification vector and the total loss function of the discriminator. For example, after the evaluator is optimized four times, the image classification model and the discriminator are optimized once. During reverse optimization of the image classification model and the discriminator, the reverse optimization may be performed successively, or the reverse optimization may be performed simultaneously.

During reverse optimization of the evaluator, for an input of the prior distribution, an output closer to 1 indicates a smaller loss function value and indicates a smaller change in the parameter during the back propagation, and for an input of the data sample, an output closer to 0 indicates a smaller loss function value and indicates a smaller change in the parameter during the back propagation. In a case that the image classification model is reversely optimized, for an input of the data sample, an output closer to 1 indicates a smaller loss function value and indicates a smaller change in the parameter during the back propagation. The prior distribution is not considered during the reverse optimization of the image classification model. During the reverse optimization of the image classification model, the total loss function of the evaluator may indicate a difference between the feature distribution learned by the current image classification model and the prior distribution, and in a case that the total loss function of the evaluator starts to converge, it indicates that the feature distribution learned by the image classification model is close to the prior distribution and the training may be stopped.

To sum up, by the method provided in this embodiment, for a data sample of a classification object in a classification service, there is no need to execute an additional classification algorithm, and there is no need to generate a real image to compare with a raw image. By determining the correlation between the data sample and the classification vector, and by introducing the category prior distribution to the category vector and introducing the intra-class style prior distribution to the intra-class style vector, to determine the score at which the classification vector obeys the prior distribution, the image classification model can be trained by using the correlation and the score, which can effectively improve learning of the classification vector by the image classification model. Because the feature distribution learned by the image classification model is close to the prior distribution, and the category vector is effectively decoupled from the intra-class style vector, the classification target corresponding to the data sample can be obtained according to the category vector. Therefore, the precision of data classification can be effectively improved without manual annotation. Further, effective training of an image segmentation network without manual annotation is implemented.

Figure 6:
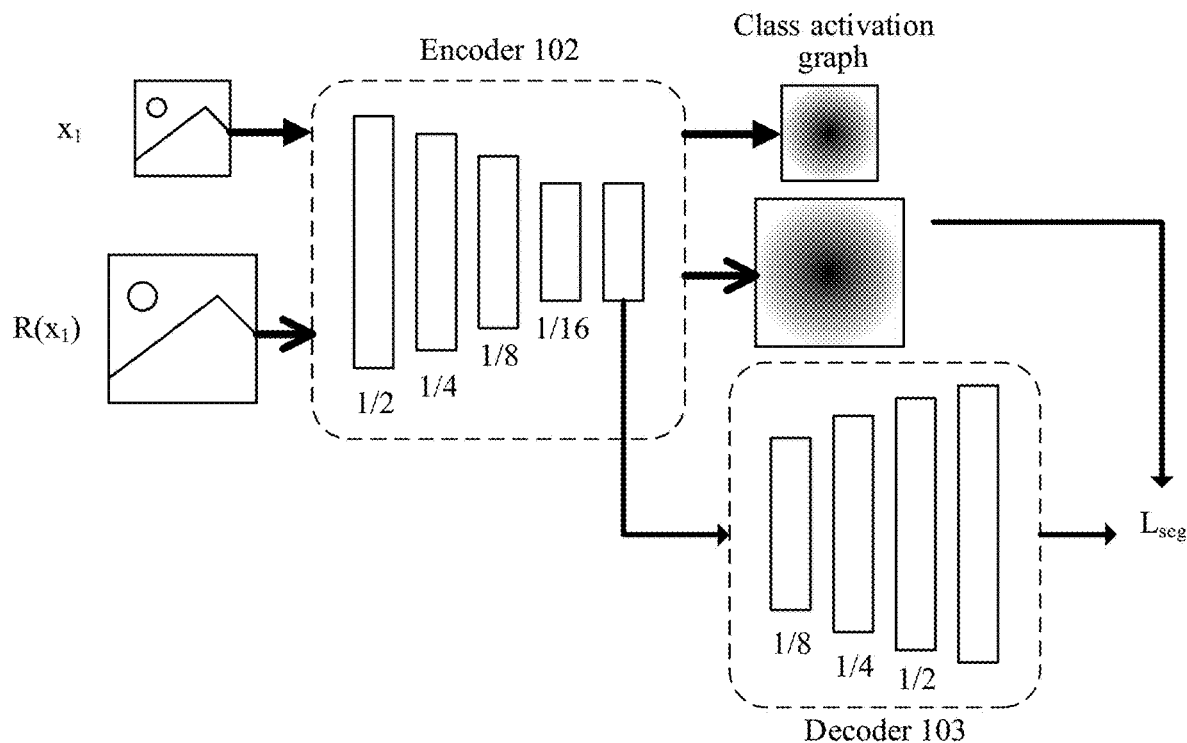
FIG. 6 is a schematic diagram of a method for training an image segmentation model according to another exemplary embodiment of this disclosure.

Exemplarily, FIG. 6 is a schematic diagram of training an image segmentation model by using the method for training an image segmentation model provided in this disclosure.

An encoder 102 in FIG. 6 adopts the encoder of the image classification model in the embodiments shown in FIG. 4, and in a training stage of the image segmentation model, a fully-connected layer (not shown) is further connected to the encoder 102.

During training, first a sample image $x_1$ is obtained, and the sample image $x_1$ is upsampled (generally the length and the width are expanded to two times of the original image), to obtain a scale image $x_2=R(x_1)$.

The sample image $x_1$ and the scale image $x_2$ are respectively inputted to the encoder, and the encoder outputs a sample image feature of the sample image $x_1$ and a scale image feature of the scale image $x_2$.

The sample image feature is inputted to the fully-connected layer to output a sample classification result, and the scale image feature is inputted to the fully-connected layer to output a scale classification result.

Based on the sample classification result and the sample image feature, a sample class activation graph $C_1$ of the sample image is calculated according to a calculation formula for a class activation graph. Based on the scale classification result and the scale image feature, a scale class activation graph $C_2$ of the scale image is calculated according to a calculation formula for a class activation graph.

The sample image feature is inputted to a decoder 103 to obtain a sample segmentation result $s_1$. The scale image feature is inputted to the decoder 103 to obtain a scale segmentation result $s_2$.

Two constraints are introduced, one is that the segmentation result needs to be close to the class activation graph as much as possible, and the other one is that a target area (an area where the classification target is located) divided after a scale change needs to be kept consistent through a same scale change. Based on this idea, the sample class activation graph loss is calculated based on the sample class activation graph and the sample segmentation result; the scale class activation graph loss is calculated based on the scale class activation graph and the scale segmentation results; and the scale loss is calculated based on the sample segmentation result and the scale segmentation result. A weighted sum of the sample class activation graph loss, the scale class activation graph loss, and the scale loss is calculated, to obtain a total loss $L_{seg}$.

According to the total loss $L_{seg}$, a network parameter in the decoder is optimized by a back propagation method. The optimization method adopts an Adam-based gradient descent method, the learning rate is 0.0001, for Adam parameters, an exponential decay rate $\beta_1$ of first-order moment estimation is set to 0.5, and an exponential decay rate $\beta_2$ of a second-order moment estimation is set to 0.9. As mentioned above, the image classification model is optimized first, then the encoder part is fixed, migrated to the image segmentation model, and then the decoder part of the image segmentation model is optimized.

Exemplarily, after the image segmentation model is obtained after the training, an exemplary embodiment of image segmentation using a trained image segmentation model is provided.

Figure 7:
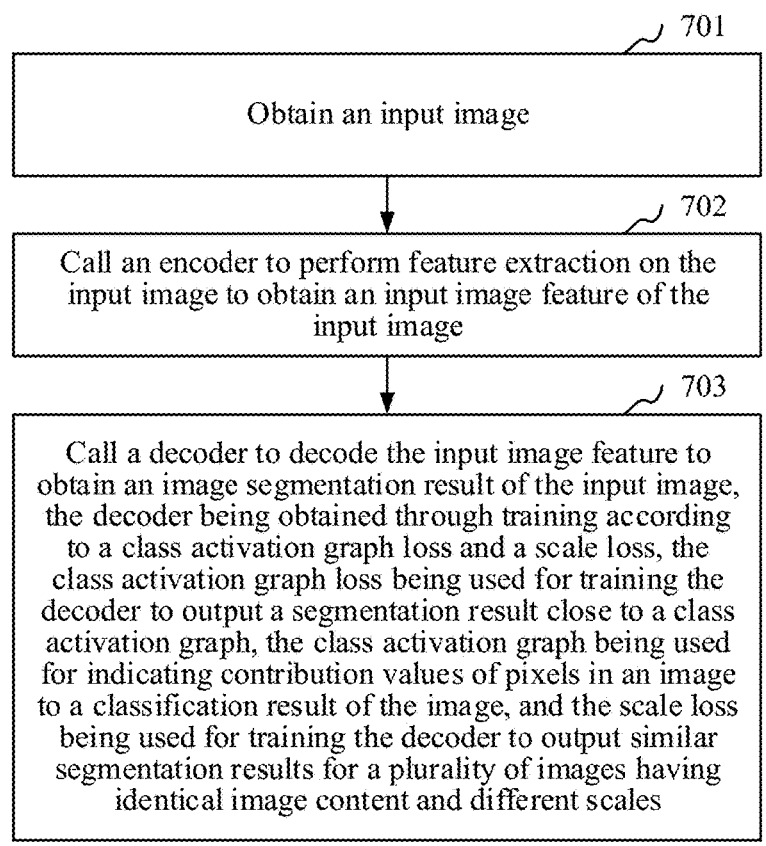
FIG. 7 is a method flowchart of an image segmentation method according to another exemplary embodiment of this disclosure.

FIG. 7 is a flowchart of an image segmentation method according to an exemplary embodiment of this disclosure. The method may be performed by a computer device, for example, a terminal or a server shown in FIG. 1. Exemplarily, the computer device that performs the method for training an image segmentation model and the computer device that performs the image segmentation method may be the same computer device, or may be different computer devices. The method includes the following steps.

In step 701, an input image is obtained.

Exemplarily, the input image may be any image on which image segmentation needs to be performed.

For example, in a case that the image segmentation model is trained to segment a human face in an image, the input image may be an image including a human face. In a case that the image segmentation model is trained to segment a lesion in an image, the input image may be an image including a lesion. Certainly, the input image may not include the classification target of the image segmentation model either, that is, the input image may alternatively not include a human face, or, not include a lesion.

In step 702, an encoder is called to perform feature extraction on the input image to obtain an input image feature of the input image.

Exemplarily, the encoder is an encoder in the image segmentation model mentioned in any of the foregoing embodiments.

Exemplarily, sources of the encoder vary depending on different classification targets of image segmentation models. In a case that a classification target of an image segmentation model is a human face, a parameter of the encoder is set according to a parameter of a classification encoder of a human face classification model, the human face classification model being used for identifying whether the input image includes a human face.

In a case that a classification target of an image segmentation model is a lesion, a parameter of the encoder is set according to a parameter of a classification encoder of a lesion classification model, the lesion classification model being used for identifying whether the input image includes a lesion.

In a case the encoder of the image segmentation model is set by using the classification encoder of the image classification model, the encoder of the image segmentation model can accurately extract a feature of an image in a classification task. Because the classification target of the image segmentation is the same as the classification target of the image classification, the image segmentation model can perform accurate image segmentation according to the extracted feature, which not only simplifies the process of training the image segmentation model, but also improves the segmentation precision of the image segmentation model.

In step 703, a decoder is called to decode the input image feature to obtain an image segmentation result of the input image, the decoder being obtained through training according to a class activation graph loss and a scale loss. The class activation graph loss is calculated based on a training sample class activation graph, a training sample segmentation result, a scale class activation graph, and a scale segmentation result. The training sample segmentation result includes classification probability values of pixels in the training image and the scale segmentation result includes classification probability values of pixels in a scale image obtained by magnifying the training image or reducing the sample image. The training sample class activation graph indicates contribution values of pixels in a training image to a classification result of the training image, the scale class activation graph indicates contribution values of pixels in the scale image to a classification result of the scale image. The class activation graph loss is used for training the decoder to output a segmentation result corresponding to a class activation graph, and the scale loss is used for training the decoder to output corresponding segmentation results for a plurality of images having identical image content and different scales.

Exemplarily, the decoder is a decoder in the image segmentation model mentioned in any of the foregoing embodiments. Reference may be made to the foregoing embodiments for the method for training the decoder.

The segmentation result outputted by the encoder includes probability values at which pixels in the input image pertain to classification targets, or the segmentation result outputted by the encoder includes classification targets to which pixels in the input image pertain.

For example, in a case that the classification target of the image segmentation model is a human face, the image segmentation result includes probability values at which pixels in the input image pertain to the human face, or the image segmentation result includes whether pixels in the input image pertain to the human face.

For example, in a case that the classification target of the image segmentation model is a lesion, the image segmentation result includes probability values at which pixels in the input image pertain to the lesion, or the image segmentation result includes whether pixels in the input image pertain to the lesion.

To sum up, in the method provided in this embodiment, by performing image segmentation on an input image by using a trained image segmentation model and performing feature extraction and image segmentation on the input image by using a neural network, the image can be segmented based on a deep feature of the image, and the precision of image segmentation is improved. Moreover, because the decoder of the image segmentation model is trained based on scale invariance, the image segmentation model outputs similar image segmentation results for a plurality of images having identical image content and different scales, which is closer to an actual situation of image segmentation, and further improves the precision of the image segmentation.

Exemplarily, the image segmentation model provided in this disclosure may be used in a plurality of application scenarios for image segmentation of different classification targets in an image. For example, in the foregoing application scenarios of human face identification and lesion identification, this disclosure further provides an exemplary embodiment of training the image segmentation models corresponding to the two application scenarios.

Exemplarily, an exemplary embodiment of training an image segmentation model for segmenting a human face area in an image by using the method for training an image segmentation model provided in this disclosure is provided.

First, the image classification model for identifying a human face is trained. The image classification model includes a classification encoder and a classification fully-connected layer. The image classification model is used for clustering, that is, a plurality of inputted images are clustered into a class including a human face and a class not including a human face.

In step 1, a data sample is obtained.

In step 2, a classification encoder and a classification fully-connected layer are called to perform feature extraction and classification on the data sample, to obtain a classification vector of the data sample and to determine a correlation between the data sample and the classification vector, the classification vector including a category vector and an intra-class style vector, and the category vector being used for describing whether the input image includes a human face.

In step 3, a category prior distribution is applied to the category vector and an intra-class style prior distribution is applied to the intra-class style vector, to determine a score at which the classification vector obeys a prior distribution.

In step 4, an image classification model is trained according to at least the correlation and the score.

Then, the image segmentation model is trained based on the trained image classification model. The image segmentation model includes an encoder, a fully-connected layer, and a decoder in a training stage, and the image segmentation model includes an encoder and a decoder in an application stage.

In step 1, an encoder is initialized according to a parameter of a classification encoder and a fully-connected layer is initialized according to a parameter of a classification fully-connected layer, that is, the encoder and the fully-connected layer can accurately classify an input image and identify whether the image includes a human face.

In step 2, a training data set is obtained, which includes at least one group of a sample image and a scale image, the sample image is an image that includes or does not include a human face, the scale image is an image obtained by upsampling the sample image, and a size of the scale image is two times of a size of the sample image.

In step 3, the encoder is called to perform feature extraction on the sample image to obtain a sample image feature and the fully-connected layer is called to perform classification on the sample image feature to obtain a sample classification result of the sample image, the sample classification result including a probability value at which the sample image includes a human face; and the encoder is called to perform feature extraction on the scale image to obtain a scale image feature and the fully-connected layer is called to perform classification on the scale image feature to obtain a scale classification result of the scale image, the scale classification result including a probability value at which the scale image includes a human face.

In step 4, a decoder is called to decode the sample image feature to obtain a sample segmentation result of the sample image, the sample segmentation result including a probability value at which each pixel in the sample image pertains to a human face; and the decoder is called to decode the scale image feature to obtain a scale segmentation result of the scale image, the scale segmentation result including a probability value at which each pixel in the scale image pertains to a human face.

In step 5, a sample class activation graph of the sample image is calculated according to the sample image feature and sample classification result; and a scale class activation graph of the scale image is calculated based on the scale image feature and the scale classification result.

In step 6, a sample class activation graph loss of the sample class activation graph and the sample segmentation result is calculated, a scale class activation graph loss of the scale class activation graph and the scale segmentation result is calculated, and a scale loss of the sample segmentation result and the scale segmentation result is calculated; and a weighted sum of the sample class activation graph loss, the scale class activation graph loss, and the scale loss is calculated to obtain a total loss.

In step 7, the decoder is trained according to the total loss.

In step 8, step 3 to step 7 are repeated to iteratively train the decoder, to obtain a final image segmentation model.

In step 9, a human face area in the image is segmented by using the trained image segmentation model.

Exemplarily, an exemplary embodiment of training an image segmentation model for segmenting a lesion area in an image by using the method for training an image segmentation model provided in this disclosure is provided.

First, the image classification model for identifying a lesion is trained. The image classification model includes a classification encoder and a classification fully-connected layer. The image classification model is used for clustering, that is, a plurality of inputted images are clustered into a class including a lesion and a class not including a lesion. Exemplarily, the image classification model may also be used for identifying a plurality of specific types of lesions, for example, for clustering a plurality of inputted images into a lesion 1, a lesion 2, a lesion 3, and normal.

In step 1, a data sample is obtained.

In step 2, a classification encoder and a classification fully-connected layer are called to perform feature extraction and classification on the data sample, to obtain a classification vector of the data sample and to determine a correlation between the data sample and the classification vector, the classification vector including a category vector and an intra-class style vector, the category vector being used for describing whether the input image includes a lesion, or, used for describing probability values at which the inputted image pertain to the plurality of lesions.

In step 3, a category prior distribution is applied to the category vector and an intra-class style prior distribution is applied to the intra-class style vector, to determine a score at which the classification vector obeys a prior distribution.

In step 4, an image classification model is trained according to at least the correlation and the score.

Then, the image segmentation model is trained based on the trained image classification model. The image segmentation model includes an encoder, a fully-connected layer, and a decoder in a training stage, and the image segmentation model includes an encoder and a decoder in an application stage.

In step 1, an encoder is initialized according to a parameter of a classification encoder and a fully-connected layer is initialized according to a parameter of a classification fully-connected layer, that is, the encoder and the fully-connected layer can accurately classify an input image and identify whether the image includes a lesion, or, identify which type of lesions the image pertains to.

In step 2, a training data set is obtained, which includes at least one group of a sample image and a scale image, the sample image is an image that includes or does not include a lesion, the scale image is an image obtained by upsampling the sample image, and a size of the scale image is two times of a size of the sample image.

In step 3, the encoder is called to perform feature extraction on the sample image to obtain a sample image feature and the fully-connected layer is called to perform classification on the sample image feature to obtain a sample classification result of the sample image, the sample classification result including a probability value at which the sample image includes a lesion area, or the sample classification result including a probability value at which the sample image pertains to each type of lesions; and the encoder is called to perform feature extraction on the scale image to obtain a scale image feature and the fully-connected layer is called to perform classification on the scale image feature to obtain a scale classification result of the scale image, the scale classification result including a probability value at which the scale image includes a lesion, or, the scale classification result including a probability value at which the scale image pertains to each type of lesions.

In step 4, the decoder is called to decode the sample image feature to obtain a sample segmentation result of the sample image, the sample segmentation result including a probability value at which each pixel in the sample image pertains to a lesion, or the sample segmentation result including a probability value at which each pixel in the sample image pertains to each lesion; and the decoder is called to decode the scale image feature to obtain a scale segmentation result of the scale image, the scale segmentation result including a probability value at which each pixel in the scale image pertains to a lesion, or, the scale segmentation result including a probability value at which each pixel in the scale image pertains to each lesion.

In step 5, a sample class activation graph of the sample image is calculated according to the sample image feature and sample classification result; and a scale class activation graph of the scale image is calculated based on the scale image feature and the scale classification result.

In step 6, a sample class activation graph loss of the sample class activation graph and the sample segmentation result is calculated, a scale class activation graph loss of the scale class activation graph and the scale segmentation result is calculated, and a scale loss of the sample segmentation result and the scale segmentation result is calculated; and a weighted sum of the sample class activation graph loss, the scale class activation graph loss, and the scale loss is calculated to obtain a total loss.

In step 7, the decoder is trained according to the total loss.

In step 8, step 3 to step 7 are repeated to iteratively train the decoder, to obtain a final image segmentation model.

In step 9, a lesion area in the image is segmented by using the trained image segmentation model.

The following is an apparatus embodiment of this disclosure. For details not described in detail in the apparatus embodiment, reference may be made to corresponding record in the foregoing method embodiments. Details are not described herein again.

Figure 8:
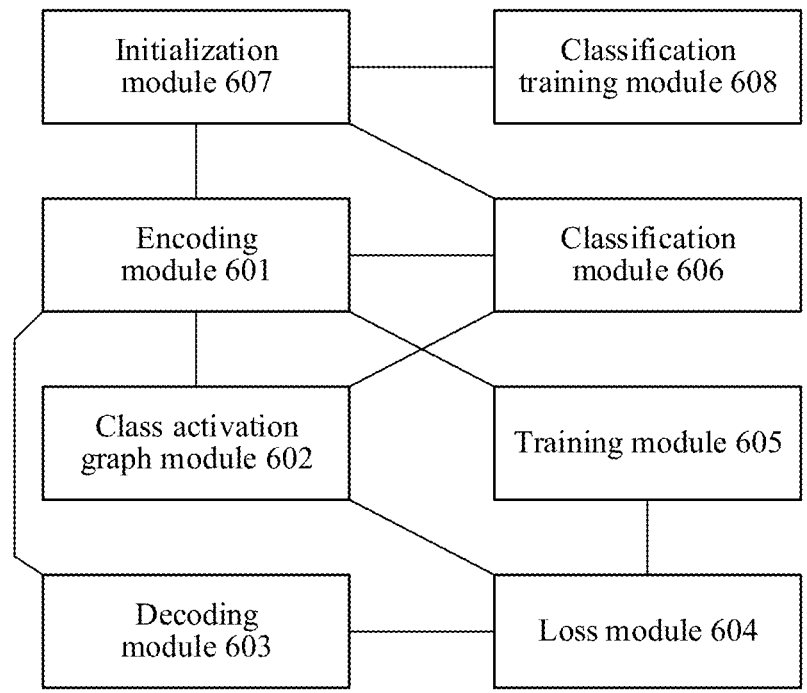
FIG. 8 is a block diagram of an apparatus for training an image segmentation model according to another exemplary embodiment of this disclosure.

FIG. 8 is a schematic structural diagram of an apparatus for training an image segmentation model according to an exemplary embodiment of this disclosure. The apparatus may be implemented as all or part of a computer device by software, hardware, or a combination of both, the image segmentation model includes an encoder and a decoder, and the apparatus includes: an encoding module 601, configured to call the encoder to perform feature extraction on a sample image and a scale image to obtain a sample image feature of the sample image and a scale image feature of the scale image, the scale image including: at least one of an image obtained by magnifying the sample image or an image obtained by reducing the sample image; a class activation graph module 602, configured to perform class activation graph calculation based on the sample image feature to obtain a sample class activation graph of the sample image, and perform class activation graph calculation based on the scale image feature to obtain a scale class activation graph of the scale image, the class activation graph being used for indicating contribution values of pixels in an image to a classification result of the image; a decoding module 603, configured to call the decoder to decode the sample image feature to obtain a sample segmentation result of the sample image, and call the decoder to decode the scale image feature to obtain a scale segmentation result of the scale image, the sample segmentation result including classification probability values of pixels in the sample image; a loss module 604, configured to calculate a class activation graph loss based on the sample class activation graph, the sample segmentation result, the scale class activation graph, and the scale segmentation result, and calculate a scale loss based on the sample segmentation result and the scale segmentation result, the class activation graph loss being used for training the decoder to enable the sample segmentation result to be close to the sample class activation graph, and to enable the scale segmentation result to be close to the scale class activation graph, and the scale loss being used for training the decoder to enable the sample segmentation result to be close to the scale segmentation result; and a training module 605, configured to train the decoder based on the class activation graph loss and the scale loss.

In an embodiment, the class activation graph loss includes a sample class activation graph loss and a scale class activation graph loss; the loss module 604 is configured to calculate the sample class activation graph loss based on the sample class activation graph and the sample segmentation result; the loss module 604 is configured to calculate the scale class activation graph loss based on the scale class activation graph and the scale segmentation result; and the loss module 604 is configured to calculate the scale loss based on sample segmentation result and the scale segmentation result.

In an embodiment, the loss module 604 is configured to scale, according to a scale relationship between the sample image and the scale image, the sample segmentation result to a same size as the scale segmentation result, to obtain a scaled sample segmentation result; and the loss module 604 is configured to calculate the scale loss based on an error between the scale segmentation result and the scaled sample segmentation result.

In an embodiment, the loss module 604 is configured to calculate a first matrix difference between the scale segmentation result and the scaled sample segmentation result, and determine a 2-norm of the first matrix difference as the scale loss.

In an embodiment, the loss module 604 is configured to determine a cross entropy of the sample class activation graph and the sample segmentation result as the sample class activation graph loss; and the loss module 604 is configured to determine a cross entropy of the scale class activation graph and the scale segmentation result as the scale class activation graph loss.

In an embodiment, the loss module 604 is configured to calculate a weighted sum of the sample class activation graph loss, the scale class activation graph loss, and the scale loss; and the training module 605 is configured to train the decoder according to the weighted sum.

In an embodiment, the image segmentation model further includes a pretrained fully-connected layer; and the apparatus further includes: a classification module 606, configured to call the fully-connected layer to perform classification and prediction on the sample image feature, to obtain a sample classification result of the sample image; and call the fully-connected layer to perform classification and prediction on the scale image feature, to obtain a scale classification result of the scale image; the class activation graph module 602 being configured to perform calculation based on the sample image feature and the sample classification result to obtain the sample class activation graph of the sample image; and the class activation graph module 602 being configured to perform calculation based on the scale image feature and the scale classification result to obtain the scale class activation graph of the scale image.

In an embodiment, the encoder is a pretrained encoder; and the apparatus further includes: an initialization module 607, configured to set a parameter of the encoder according to a parameter of a classification encoder in a trained image classification model, a classification target of the image classification model being the same as that of the image segmentation model.

In an embodiment, the apparatus further includes: the initialization module 607, configured to set a parameter of the fully-connected layer according to a parameter of a classification fully-connected layer in a trained image classification model, a classification target of the image classification model being the same as that of the image segmentation model.

In an embodiment, the image classification model includes a classification encoder and a classification fully-connected layer; and the apparatus further includes: a classification training module 608, configured to obtain a data sample; call a classification encoder and a classification fully-connected layer to perform feature extraction and classification on the data sample, to obtain a classification vector of the data sample and to determine a correlation between the data sample and the classification vector, the classification vector including a category vector and an intra-class style vector; introduce a category prior distribution to the category vector and introduce an intra-class style prior distribution to the intra-class style vector, to determine a score at which the classification vector obeys a prior distribution; and train an image classification model according to at least the correlation and the score.

Figure 9:
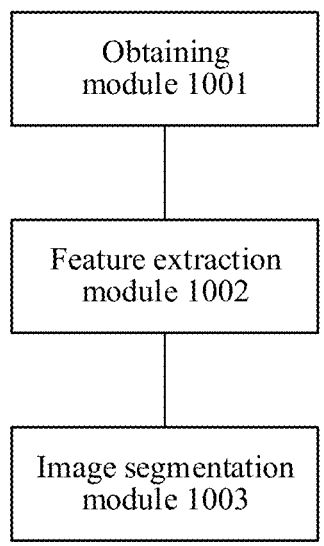
FIG. 9 is a block diagram of an image segmentation apparatus according to another exemplary embodiment of this disclosure.

FIG. 9 is a schematic structural diagram of an image segmentation apparatus according to an exemplary embodiment of this disclosure. The apparatus may be implemented as all or part of a computer device by software, hardware, or a combination of both, the image segmentation model includes an encoder and a decoder, and the apparatus includes: an obtaining module 1001, configured to obtain an input image; a feature extraction module 1002, configured to call an encoder to perform feature extraction on the input image to obtain an input image feature of the input image; and an image segmentation module 1003, configured to call a decoder to decode the input image feature to obtain an image segmentation result of the input image, the decoder being obtained through training according to a class activation graph loss and a scale loss, the class activation graph loss being used for training the decoder to output a segmentation result close to a class activation graph, the class activation graph being used for indicating contribution values of pixels in an image to a classification result of the image, and the scale loss being used for training the decoder to output similar segmentation results for a plurality of images having identical image content and different scales.

In an embodiment, the methods of the present disclosure are implemented by software modules stored on a non-transitory computer-readable storage medium. In this embodiment, the software modules, when executed by a computer device, cause the computer device to perform a method of training an image segmentation model that includes an encoder and a decoder. The method includes calling the encoder to perform feature extraction on a sample image and a scale image to obtain a sample image feature of the sample image and a scale image feature of the scale image. The scale image comprising an image obtained by magnifying the sample image or an image obtained by reducing the sample image. The method also includes performing a class activation graph calculation based on the sample image feature to obtain a sample class activation graph of the sample image, and performing the class activation graph calculation based on the scale image feature to obtain a scale class activation graph of the scale image. The sample class activation graph and the scale class activation graph indicate contribution values of pixels in the sample image and the scale image, respectively, to a classification result of the sample image and the scale image, respectively. The method further includes calling the decoder to decode the sample image feature to obtain a sample segmentation result of the sample image, and calling the decoder to decode the scale image feature to obtain a scale segmentation result of the scale image. The sample segmentation result includes classification probability values of pixels in the sample image and the scale segmentation result includes classification probability values of pixels in the scale image. The method further includes calculating a class activation graph loss based on the sample class activation graph, the sample segmentation result, the scale class activation graph, and the scale segmentation result, and calculating a scale loss based on the sample segmentation result and the scale segmentation result. The method also includes training the decoder based on the class activation graph loss and the scale loss, the class activation graph loss being used for training the decoder to enable the sample segmentation result to correspond to the sample class activation graph, and to enable the scale segmentation result to correspond to the scale class activation graph. The scale loss is used for training the decoder to enable the sample segmentation result to correspond to the scale segmentation result.

In another embodiment, the software modules, when executed by a computer device, cause the computer device to perform an image segmentation method that includes obtaining an input image, and calling an encoder to perform feature extraction on the input image to obtain an input image feature of the input image. The method further includes calling a decoder to decode the input image feature to obtain an image segmentation result of the input image, the decoder being obtained through training according to a class activation graph loss and a scale loss. The class activation graph loss is calculated based on a training sample class activation graph, a training sample segmentation result, a scale class activation graph, and a scale segmentation result. The training sample segmentation result includes classification probability values of pixels in a training image and the scale segmentation result comprising classification probability values of pixels in a scale image obtained by magnifying the training image or reducing the training image. The training sample class activation graph indicates contribution values of pixels in the training image to a classification result of the training image, the scale class activation graph indicates contribution values of pixels in the scale image to a classification result of the scale image. The class activation graph loss is used for training the decoder to output a segmentation result corresponding to a class activation graph, and the scale loss is used for training the decoder to output corresponding segmentation results for a plurality of images having identical image content and different scales.

In an embodiment, a parameter of the encoder is set according to a parameter of a classification encoder of a human face classification model, the human face classification model being used for identifying whether the input image includes a human face; and the image segmentation result includes probability values at which pixels in the input image pertain to the human face.

In an embodiment, a parameter of the encoder is set according to a parameter of a classification encoder of a lesion classification model, the lesion classification model being used for identifying whether the input image includes a lesion; and the image segmentation result includes probability values at which pixels in the input image pertain to the lesion.

Figure 10:
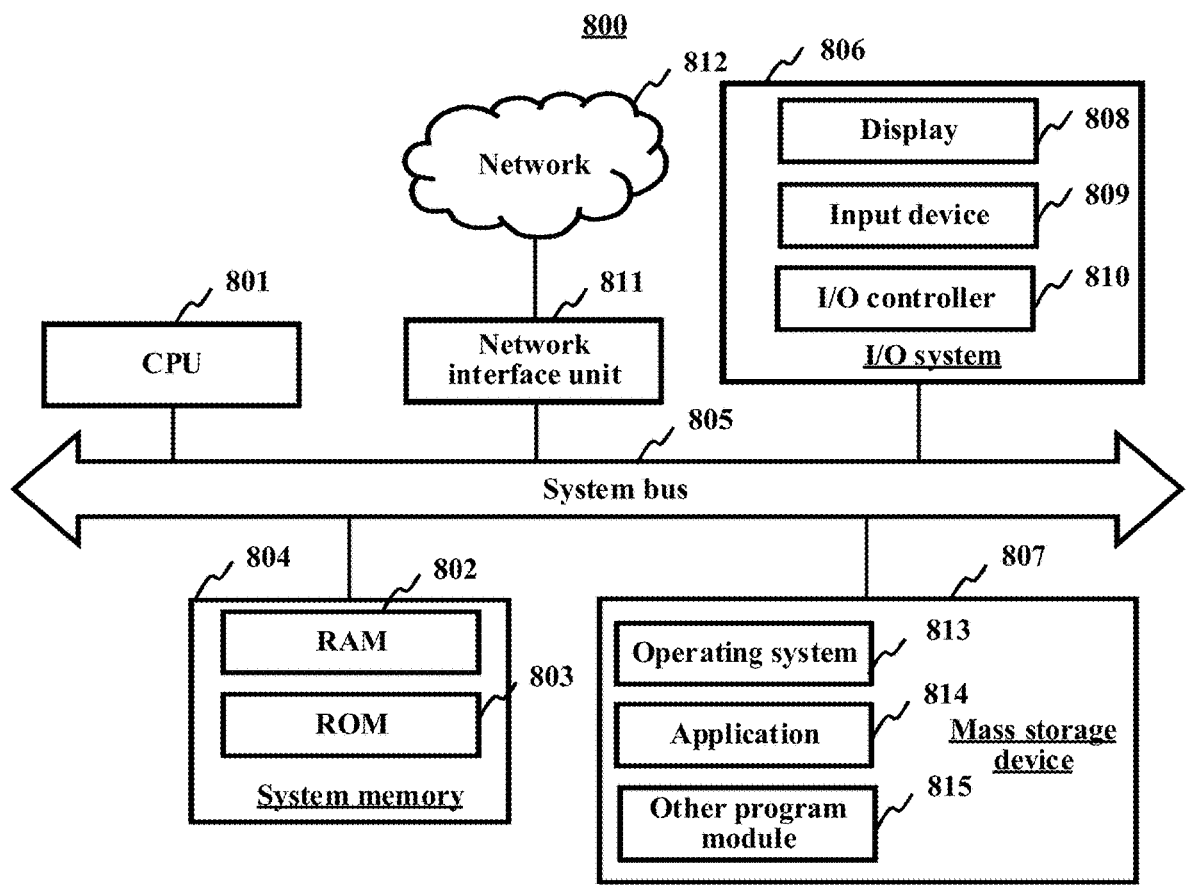
FIG. 10 is a schematic structural diagram of a server according to another exemplary embodiment of this disclosure.

FIG. 10 is a schematic structural diagram of a server according to an exemplary embodiment of this disclosure. Specifically, a server 800 includes a CPU 801, a system memory 804 including a RAM 802 and a read-only memory (ROM) 803, and a system bus 805 connecting the system memory 804 and the CPU 801. The server 800 further includes a basic input/output system (I/O system) 806 assisting in transmitting information between devices in a computer, and a large-capacity storage device 807 configured to store an operating system 813, an application program 814 and another program module 815.

The basic I/O system 806 includes a display 808 configured to display information and an input device 809 such as a mouse or a keyboard that is used for inputting information through a user account. The display 808 and the input device 809 are both connected to the CPU 801 by using an input/output controller 810 connected to the system bus 805. The display 808 and the input device 809 are both connected to the CPU 801 by using an input/output controller 810 connected to the system bus 805. Similarly, the input/output controller 810 further provides an output to a display screen, a printer, or another type of output device.

The mass storage device 807 is connected to the CPU 801 by using a mass storage controller (not shown) connected to the system bus 805. The mass storage device 807 and a computer-readable storage medium associated with the mass storage device 1007 provide non-volatile storage for the server 800.

That is, the mass storage device 807 may include a computer-readable storage medium (not shown) such as a hard disk or a compact disc ROM (CD-ROM) drive.

That is, the mass storage device 807 may include a computer-readable storage medium (not shown) such as a hard disk or a compact disc ROM (CD-ROM) drive. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The foregoing system memory 804 and mass storage device 807 may be collectively referred to as a memory.

According to various embodiments of this disclosure, the server 800 may further be connected, by using a network such as the Internet, to a remote computer on the network and run. That is, the server 800 may be connected to a network 812 by using a network interface unit 811 that is connected to the system bus 805, or may be connected to a network of another type or a remote computer system (not shown) by using the network interface unit 811.

This disclosure further provides a terminal, including a processor and a memory, the memory storing at least one instruction, the at least one instruction being loaded and executed by the processor to implement the method for training an image segmentation model and the image segmentation method provided in the foregoing method embodiments. The terminal may be a terminal provided in FIG. 11 below.

Figure 11:
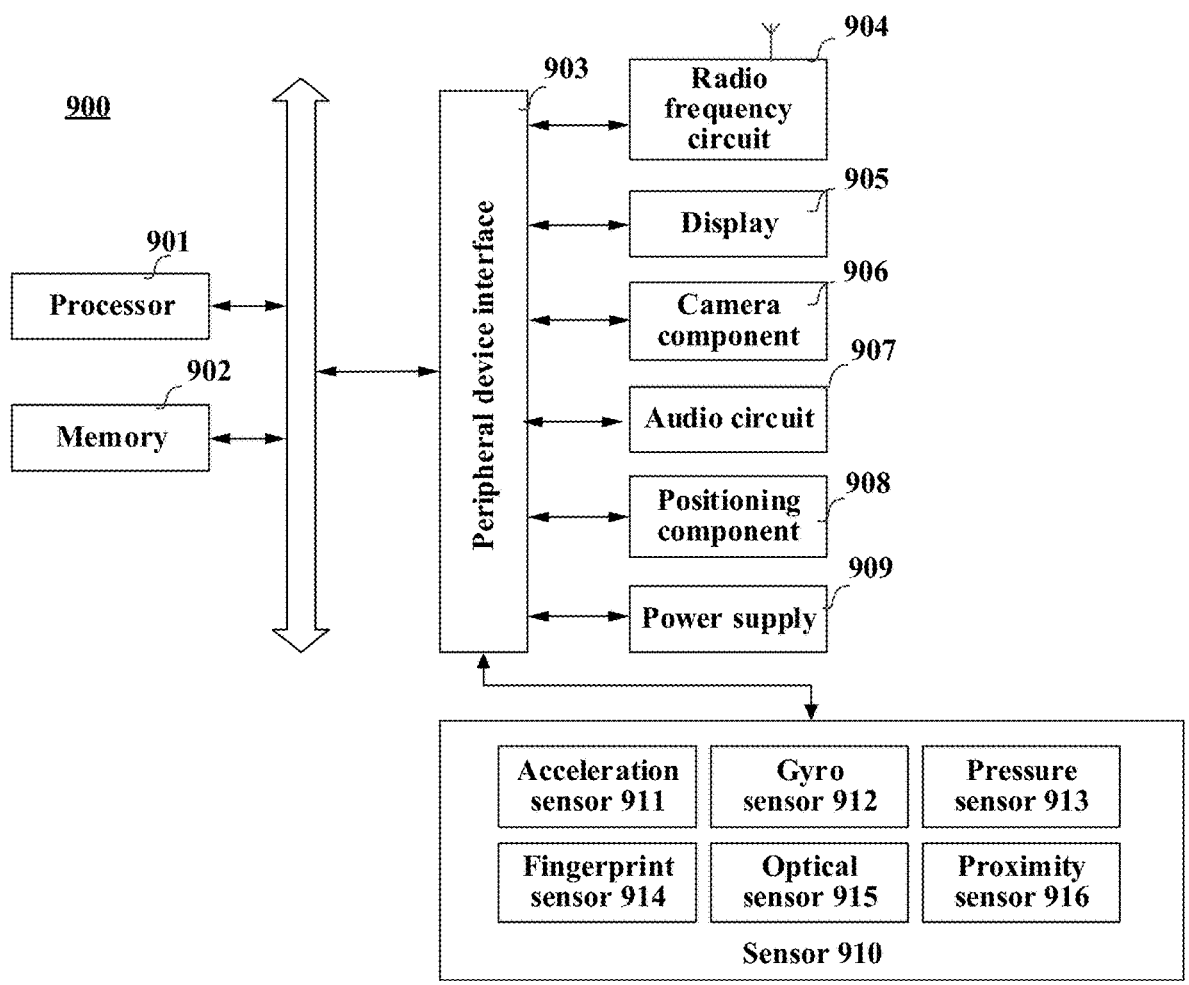
FIG. 11 is a block diagram of a terminal according to another exemplary embodiment of this disclosure.

FIG. 11 is a structural block diagram of a terminal 900 according to an exemplary embodiment of this disclosure. The terminal 900 may be a smartphone, a tablet computer, a Moving Picture Experts Group Audio Layer III (MP3) player, a Moving Picture Experts Group Audio Layer IV (MP4) player, a notebook computer, or a desktop computer. The terminal 900 may also be referred to as another name such as a user account device, a portable terminal, a laptop terminal, or a desktop terminal.

Generally, the terminal 900 includes: a processor 901 (including processing circuitry) and a memory 902 (including a non-transitory computer-readable storage medium).

The processor 901 may include one or more processing cores such as a 4-core processor or an 8-core processor. The memory 902 may include one or more computer-readable storage media. The computer-readable storage media may be non-transitory. In some embodiments, the non-transitory computer-readable storage medium in the memory 902 is configured to store at least one computer-readable instruction, the at least one computer-readable instruction is configured to be executed by the processor 901 to implement the method for training an image segmentation model and the image segmentation method according to the method embodiments of this disclosure.

In some embodiments, the terminal 900 may include a peripheral device interface 903 and at least one peripheral device. The processor 901, the memory 902, and the peripheral device interface 903 may be connected by using a bus or a signal cable. Each peripheral device may be connected to the peripheral device interface 903 by using a bus, a signal line, or a circuit board. Specifically, the peripheral devices include: at least one of a radio frequency (RF) circuit 904, a display screen 905, a camera assembly 906, an audio circuit 907, a positioning assembly 908, and a power supply 909.

In some embodiments, the terminal 900 also includes one or more sensors 910. The one or more sensors 910 include, but are not limited to: an acceleration sensor 911, a gyro sensor 912, a pressure sensor 913, a fingerprint sensor 914, an optical sensor 915, and a proximity sensor 916.

A person skilled in the art can understand that the structure shown in FIG. 11 does not constitute a limitation to the terminal 900, and the terminal may include more or fewer components than those shown in the figure, or some components may be combined, or a different component arrangement may be used.

The memory further includes one or more programs. The one or more programs are stored in the memory. The one or more programs are configured to perform the method for training an image segmentation model and the image segmentation method provided in the embodiments of this disclosure.

This disclosure further provides a computer device. The computer device includes a processor and a memory, the memory storing at least one instruction, at least one program, a code set, or an instruction set, the at least one instruction, the at least one program, the code set, or the instruction set being loaded and executed by the processor to implement the method for training an image segmentation model and the image segmentation method provided in the foregoing method embodiments.

This disclosure further provides a computer-readable storage medium, storing at least one instruction, at least one program, a code set, or an instruction set, the at least one instruction, the at least one program, the code set, or the instruction set being loaded or executed by a processor to implement the method for training an image segmentation model and the image segmentation method provided in the foregoing method embodiments.

This disclosure further provides a computer program product or computer-readable instructions, the computer program product includes computer instructions, and the computer instructions are stored in a computer-readable storage medium. A processor of a computer device reads the computer-readable instructions from the computer-readable storage medium, and executes the computer-readable instructions, so that the computer device performs the method for training an image segmentation model and the image segmentation method provided in the foregoing implementations.

It is to be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of steps of the embodiments may be implemented by hardware or a program instructing related hardware. The program may be stored in a computer-readable storage medium. The storage medium mentioned above may be a ROM, a magnetic disk or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for training an image segmentation model, the image segmentation model comprising an encoder and a decoder, and the method comprising:
   calling the encoder to perform feature extraction on a sample image and a scale image to obtain a sample image feature of the sample image and a scale image feature of the scale image, the scale image comprising an image obtained by magnifying the sample image or an image obtained by reducing the sample image;

performing a class activation graph calculation based on the sample image feature to obtain a sample class activation graph of the sample image, and performing the class activation graph calculation based on the scale image feature to obtain a scale class activation graph of the scale image, the sample class activation graph and the scale class activation graph indicating contribution values of pixels in the sample image and the scale image, respectively, to a classification result of the sample image and the scale image, respectively;

calling the decoder to decode the sample image feature to obtain a sample segmentation result of the sample image, and calling the decoder to decode the scale image feature to obtain a scale segmentation result of the scale image, the sample segmentation result comprising classification probability values of pixels in the sample image and the scale segmentation result comprising classification probability values of pixels in the scale image;

calculating a class activation graph loss based on the sample class activation graph, the sample segmentation result, the scale class activation graph, and the scale segmentation result, and calculating a scale loss based on the sample segmentation result and the scale segmentation result; and training the decoder based on the class activation graph loss and the scale loss, wherein the class activation graph loss trains the decoder to enable the sample segmentation result to correspond to the sample class activation graph, and to enable the scale segmentation result to correspond to the scale class activation graph, and wherein the scale loss trains the decoder to enable the sample segmentation result to correspond to the scale segmentation result.

2. The method according to claim 1, wherein
the class activation graph loss comprises a sample class activation graph loss and a scale class activation graph loss; and
the calculating the class activation graph loss based on the sample class activation graph, the sample segmentation result, the scale class activation graph, and the scale segmentation result, and the calculating the scale loss based on the sample segmentation result and the scale segmentation result comprises:
calculating the sample class activation graph loss based on the sample class activation graph and the sample segmentation result;
calculating the scale class activation graph loss based on the scale class activation graph and the scale segmentation result; and
calculating the scale loss based on the sample segmentation result and the scale segmentation result.

3. The method according to claim 2, wherein the calculating the scale loss based on the sample segmentation result and the scale segmentation result comprises:
scaling, according to a scale relationship between the sample image and the scale image, the sample segmentation result to a same size as the scale segmentation result, to obtain a scaled sample segmentation result; and
calculating the scale loss based on an error between the scale segmentation result and the scaled sample segmentation result.

4. The method according to claim 3, wherein the calculating the scale loss based on the error between the scale segmentation result and the scaled sample segmentation result comprises:
calculating a first matrix difference between the scale segmentation result and the scaled sample segmentation result, and determining a 2-norm of the first matrix difference as the scale loss.

5. The method according to claim 2, wherein
the calculating the sample class activation graph loss based on the sample class activation graph and the sample segmentation result comprises:
determining a cross entropy of the sample class activation graph and the sample segmentation result as the sample class activation graph loss; and
the calculating the scale class activation graph loss based on the scale class activation graph and the scale segmentation result comprises:
determining a cross entropy of the scale class activation graph and the scale segmentation result as the scale class activation graph loss.

6. The method according to claim 2, wherein the training the decoder comprises:
calculating a weighted sum of the sample class activation graph loss, the scale class activation graph loss, and the scale loss; and
training the decoder according to the weighted sum.

7. The method according to claim 1, wherein
the image segmentation model further comprises a pretrained fully-connected layer; and
the method further comprises:
calling the fully-connected layer to perform a classification and prediction on the sample image feature, to obtain a sample classification result of the sample image; and
calling the fully-connected layer to perform the classification and prediction on the scale image feature, to obtain a scale classification result of the scale image;
the performing the class activation graph calculation to obtain the sample class activation graph comprises:
performing the class activation graph calculation based on the sample image feature and the sample classification result to obtain the sample class activation graph of the sample image; and
the performing the class activation graph calculation to obtain the scale class activation graph comprises:
performing the class activation graph calculation based on the scale image feature and the scale classification result to obtain the scale class activation graph of the scale image.

8. The method according to claim 7, wherein the method further comprises:
setting a parameter of the fully-connected layer according to a parameter of a classification fully-connected layer in a trained image classification model, a classification target of the trained image classification model corresponding to a segmentation target of the image segmentation model.

9. The method according to claim 1, wherein
the encoder is a pretrained encoder; and
before the calling the encoder to perform the feature extraction on the sample image and the scale image, the method further comprises:
setting a parameter of the encoder according to a parameter of a classification encoder in a trained image classification model, a classification target of the trained image classification model corresponding to a segmentation target of the image segmentation model.

10. The method according to claim 1, wherein
the image segmentation model comprises a classification encoder and a classification fully-connected layer; and
the method further comprises:
obtaining a data sample;
calling the classification encoder and the classification fully-connected layer to perform a classification feature extraction and classification on the data sample, to obtain a classification vector of the data sample and to determine a correlation between the data sample and the classification vector, the classification vector comprising a category vector and an intra-class style vector;
applying a category prior distribution to the category vector and applying an intra-class style prior distribution to the intra-class style vector, to determine a score at which the classification vector obeys a prior distribution based on the category prior distribution and the intra-class style prior distribution; and
training an image classification model according to at least the correlation and the score.

11. An image segmentation method, comprising:
obtaining an input image;
calling an encoder to perform feature extraction on the input image to obtain an input image feature of the input image; and
calling a decoder to decode the input image feature to obtain an image segmentation result of the input image, the decoder being obtained through training according to a class activation graph loss and a scale loss,
the class activation graph loss being calculated based on a training sample class activation graph, a training sample segmentation result, a scale class activation graph, and a scale segmentation result,
the training sample segmentation result comprising classification probability values of pixels in a training image and the scale segmentation result comprising classification probability values of pixels in a scale image obtained by magnifying the training image or reducing the training image,
the training sample class activation graph indicating contribution values of pixels in the training image to a classification result of the training image, the scale class activation graph indicating contribution values of pixels in the scale image to a classification result of the scale image, and
wherein the class activation graph loss trains the decoder to output a segmentation result corresponding to a class activation graph, and wherein the scale loss trains the decoder to output corresponding segmentation results for a plurality of images having identical image content and different scales.

12. The method according to claim 11, wherein a parameter of the encoder is set according to a parameter of a classification encoder of a human face classification model, the human face classification model being used for identifying whether the input image comprises a human face; and
the image segmentation result comprises probability values at which pixels in the input image pertain to the human face.

13. The method according to claim 11, wherein a parameter of the encoder is set according to a parameter of a classification encoder of a lesion classification model, the lesion classification model being used for identifying whether the input image comprises a lesion; and
the image segmentation result comprises probability values at which pixels in the input image pertain to the lesion.

14. An apparatus for training an image segmentation model, the image segmentation model comprising an encoder and a decoder, and the apparatus comprising:
processing circuitry configured to:
call the encoder to perform feature extraction on a sample image and a scale image to obtain a sample image feature of the sample image and a scale image feature of the scale image, the scale image comprising an image obtained by magnifying the sample image or an image obtained by reducing the sample image;
perform a class activation graph calculation based on the sample image feature to obtain a sample class activation graph of the sample image, and perform the class activation graph calculation based on the scale image feature to obtain a scale class activation graph of the scale image, the sample class activation graph and the scale class activation graph indicating contribution values of pixels in the sample image and the scale image, respectively, to a classification result of the sample image and the scale image, respectively;
call the decoder to decode the sample image feature to obtain a sample segmentation result of the sample image, and call the decoder to decode the scale image feature to obtain a scale segmentation result of the scale image, the sample segmentation result comprising classification probability values of pixels in the sample image and the scale segmentation result comprising classification probability values of pixels in the scale image;
calculate a class activation graph loss based on the sample class activation graph, the sample segmentation result, the scale class activation graph, and the scale segmentation result, and calculate a scale loss based on the sample segmentation result and the scale segmentation result; and
train the decoder based on the class activation graph loss and the scale loss, wherein the class activation graph loss trains the decoder to enable the sample segmentation result to correspond to the sample class activation graph, and to enable the scale segmentation result to correspond to the scale class activation graph, and wherein the scale loss trains the decoder to enable the sample segmentation result to correspond to the scale segmentation result.

15. The apparatus according to claim 14, wherein
the class activation graph loss comprises a sample class activation graph loss and a scale class activation graph loss; and
the processing circuitry is further configured to:
calculate the sample class activation graph loss based on the sample class activation graph and the sample segmentation result;
calculate the scale class activation graph loss based on the scale class activation graph and the scale segmentation result; and
calculate the scale loss based on the sample segmentation result and the scale segmentation result.

16. The apparatus according to claim 15, wherein the processing circuitry is further configured to:

scale, according to a scale relationship between the sample image and the scale image, the sample segmentation result to a same size as the scale segmentation result, to obtain a scaled sample segmentation result; and calculate the scale loss based on an error between the scale segmentation result and the scaled sample segmentation result.

17. The apparatus according to claim 16, wherein the processing circuitry is further configured to;

calculate a first matrix difference between the scale segmentation result and the scaled sample segmentation result, and determine a 2-norm of the first matrix difference as the scale loss.

18. The apparatus according to claim 15, wherein the processing circuitry is further configured to:

determine a cross entropy of the sample class activation graph and the sample segmentation result as the sample class activation graph loss; and determine a cross entropy of the scale class activation graph and the scale segmentation result as the scale class activation graph loss.

19. The apparatus according to claim 15, wherein the processing circuitry is further configured to:

calculate a weighted sum of the sample class activation graph loss, the scale class activation graph loss, and the scale loss; and train the decoder according to the weighted sum.

20. The apparatus according to claim 14, wherein the image segmentation model further comprises a pretrained fully-connected layer; and the processing circuitry is further configured to:

call the fully-connected layer to perform a classification and prediction on the sample image feature, to obtain a sample classification result of the sample image;

call the fully-connected layer to perform the classification and prediction on the scale image feature, to obtain a scale classification result of the scale image;

perform the class activation graph calculation based on the sample image feature and the sample classification result to obtain the sample class activation graph of the sample image; and perform the class activation graph calculation based on the scale image feature and the scale classification result to obtain the scale class activation graph of the scale image.

* * * * *